United States Patent
Fujiwara et al.

(10) Patent No.: US 8,385,336 B2
(45) Date of Patent: Feb. 26, 2013

(54) COMMUNICATION APPARATUS AND COMMUNICATION METHOD

(75) Inventors: Yuki Fujiwara, Osaka (JP); Yosuke Matsushita, Osaka (JP); Hideki Homma, Tokyo (JP); Naoki Morita, Fukuoka (JP)

(73) Assignee: Panasonic Corporation, Osaka (JP)

( * ) Notice: Subject to any disclaimer, the term of this patent is extended or adjusted under 35 U.S.C. 154(b) by 33 days.

(21) Appl. No.: 12/808,007

(22) PCT Filed: Oct. 2, 2009

(86) PCT No.: PCT/JP2009/005118
§ 371 (c)(1),
(2), (4) Date: Jun. 14, 2010

(87) PCT Pub. No.: WO2010/044210
PCT Pub. Date: Apr. 22, 2010

(65) Prior Publication Data
US 2011/0261706 A1     Oct. 27, 2011

(30) Foreign Application Priority Data
Oct. 15, 2008    (JP) .................................. 2008-266814

(51) Int. Cl.
*H04L 12/28* (2006.01)
(52) U.S. Cl. ........................................ 370/389; 709/238
(58) Field of Classification Search .................... None
See application file for complete search history.

(56) References Cited

U.S. PATENT DOCUMENTS
| 8,149,715 | B1 * | 4/2012 | Goel et al. | 370/238 |
| 2007/0195702 | A1 * | 8/2007 | Yuen et al. | 370/238 |
| 2007/0248065 | A1 * | 10/2007 | Banerjea et al. | 370/338 |

FOREIGN PATENT DOCUMENTS
| JP | 2006-295442 | 10/2006 |
| JP | 2007-221790 | 8/2007 |

OTHER PUBLICATIONS

International Search Report issued Nov. 2, 2009 in International (PCT) Application No. PCT/JP2009/005118.
Jun-ichi Hakoda et al., "Performance Evaluation of Mobile Ad Hoc Routing Protocols based on Link Expiration Time and Load of Node", The transactions of the Institute of Electronics, Information and Communication Engineers (J85-B), No. 12, Dec. 1, 2002, pp. 2108-2118.

(Continued)

*Primary Examiner* — Yemane Mesfin
*Assistant Examiner* — Khoa Huynh
(74) *Attorney, Agent, or Firm* — Wenderoth, Lind & Ponack, L.L.P.

(57) ABSTRACT

A source apparatus writes, in a route request packet, the number of routes requested by the source apparatus. When a relay apparatus receives a route request packet for the first time, the relay apparatus determines a waiting time period, based on a route evaluation value that indicates a state of a route through which the route request packet has passed, and starts a timer. The relay apparatus selects route request packets having as high route evaluation values as possible, among route request packets that have been received until the timer expires, the number of route request packets to be selected being equal to the number of routes requested by the source apparatus, and then broadcasts the selected route request packets.

17 Claims, 22 Drawing Sheets

OTHER PUBLICATIONS

Sze-Yao Ni et al., "The Broadcast Storm Problem in a Mobile Ad Hoc Network", Proceedings of the 5$^{th}$ annual ACM/IEEE international conference on Mobile computing and networking, ACM, 1999, pp. 151-162 (in English).

* cited by examiner

FIG. 2

| 201 — ADJACENT APPARATUS ADDRESS | A | B |
|---|---|---|
| 202 — LATEST MEASUREMENT VALUE | 50 | 100 |
| 203 — STORED MEASUREMENT VALUE | 100, 100, 50, 50, 50 | 100, 120, 80, 100, 100 |
| 204 — AVERAGE MEASUREMENT VALUE | 70 | 100 |
| 205 — MINIMUM MEASUREMENT VALUE | 50 | 80 |

COMMUNICATION APPARATUS AND COMMUNICATION METHOD

BACKGROUND OF INVENTION

1. Technical Field

The present invention relates to a communication apparatus and a communication method that are capable of searching for a route suitable to a data type used in communication to be started, and more particularly, to a communication apparatus and a communication method that are capable of, when a source apparatus requesting communication cannot directly communicate with a destination apparatus that is a destination of the communication, searching for a route on which the source apparatus communicates with the destination apparatus by multihop.

2. Background Art

Conventionally, the following method has been known as a method of searching for a route from a source apparatus to a destination apparatus when the source apparatus cannot directly communicate with the destination apparatus.

First, a source apparatus broadcasts a route request packet which specifies a destination apparatus. A communication apparatus which has received the route request packet broadcasted by another communication apparatus determines whether or not the destination apparatus specified by the received route request packet is the communication apparatus which has received the route request packet. If it is determined that the destination apparatus is not the communication apparatus which has been received the route request packet, the communication apparatus adds, to the route request packet, information indicating that the route request packet has passed through the communication apparatus, and broadcasts the resultant route request packet.

Thus, a received route request packet is repeatedly broadcasted by communication apparatuses other than the destination apparatus, and thereby the route request packet finally arrives at the destination apparatus. The route request packet received by the destination apparatus at this time includes information indicating all relay apparatuses through which the route request packet has passed from the source apparatus to the destination apparatus. The destination apparatus sets a route, based on the information indicating the relay apparatuses.

However, in the case where a communication apparatus which has received route request packets broadcasts all the received route request packets, the following problem arises.

Normally, a route request packet broadcasted by the source apparatus or a relay apparatus is received by a plurality of communication apparatuses which can directly communicate with the communication apparatus which has transmitted the route request packet. If the plurality of communication apparatuses which have received the route request packet are not the destination apparatus, each of the plurality of communication apparatuses broadcasts the route request packet. Therefore, every time one route request packet is transmitted, the route request packets whose number is the same as the number of relay apparatuses which directly receive the route request packet, are broadcasted.

Thus, in the case where an apparatus which has received route request packets broadcasts all the received route request packets, the number of next route request packets to be transmitted increases every time a route request packet is transmitted. As a result, the increased number of route request packets compresses a bandwidth used for data communication, and data communication between other apparatuses is hindered.

One of techniques intended to solve such a problem is a technique in which: a route evaluation value of a route through which a route request packet has passed is written on the route request packet; and route request packets to be broadcasted by a relay apparatus are restricted based on the route evaluation value (for example, Patent Document 1). Here, the route evaluation value indicates, for example, the length of a time period during which a state of connection being established is kept on the route, or a throughput expected when communication is performed on the route.

Hereinafter, processing in the technique of Patent Document 1 performed when a relay apparatus has received a route request packet upon searching for a route, will be described.

Every time a relay apparatus receives a route request packet, the relay apparatus calculates a route evaluation value from a state of a route through which the route request packet has passed. When a relay apparatus has received the route request packet for the first time, the relay apparatus directly broadcasts the route request packet. On the other hand, when the relay apparatus has received the route request packet for the second or subsequent time, which route request packet has passed through a route different from the route through which the route request packet received for the first time has passed, that is, when the relay apparatus has duplicately received the route request packet, the relay apparatus compares a route evaluation value of the route request packet which has been already broadcasted, with a route evaluation value of the duplicately received route request packet. If the route evaluation value of the duplicately received route request packet is higher than the route evaluation value of the route request packet which has been already transmitted, the relay apparatus broadcasts the duplicately received route request packet. On the other hand, if the route evaluation value of the duplicately received route request packet is lower than the route evaluation value of the route request packet which has been already transmitted, the relay apparatus discards the duplicately received route request packet without broadcasting the duplicately received route request packet.

PRIOR ART DOCUMENT

Patent Document

Patent Document 1: Japanese Laid-Open Patent Publication No. 2007-221790 (pages 6 and 16)

SUMMARY OF INVENTION

However, the above-described technique of the Patent Document 1 has the following problem. The problem is that, if the route evaluation value of the route request packet duplicately received by the relay apparatus is higher than the route evaluation value of the route request packet that has been already broadcasted, the number of route request packets to be broadcasted by the relay apparatus is not decreased.

Therefore, an object of the present invention is to provide a communication apparatus and a communication method that are capable of limiting, to a certain number or less, the number of route request packets to be broadcasted by a relay apparatus, and of searching for a route having a high route evaluation value, even if the relay apparatus duplicately receives, one after another, route request packets whose route evaluation values are higher than that of the route request packet that has been already broadcasted by the relay apparatus.

To achieve the above objects, the present invention has the following aspects. A first aspect of the present invention is a communication apparatus for, when a source apparatus which requests communication communicates by multihop with a destination apparatus which is a destination, transmitting a route request packet for creating a route, to relay apparatuses such that the route request packet arrives at the destination apparatus, the communication apparatus comprising: a reception section for receiving, from at least one immediately preceding relay apparatus among the relay apparatuses, that has directly transmitted the route request packet to the communication apparatus, the route request packet that includes information indicating the source apparatus, information indicating the destination apparatus, and a route evaluation value indicating a route state of a route from the source apparatus to the immediately preceding relay apparatus; an updating section for calculating a route evaluation value corresponding to a route from the source apparatus to the communication apparatus, based on: the route state of the route from the source apparatus to the immediately preceding relay apparatus, the route state of the route being written in the received route request packet; and the route state of a route from the immediately preceding relay apparatus to the communication apparatus, and for updating the route evaluation value included in the route request packet; and a control section for, when the route request packet is received, setting a predetermined waiting time period starting from a time at which the route request packet is received, for selecting a predetermined number of route request packets in descending order starting from the route request packet including the highest route evaluation value, from among route request packets updated within the waiting time period, the route request packets including the same information indicating the source apparatus and the same information indicating the destination apparatus as those included in the received route request packet; and for transmitting the selected predetermined number of route request packets to an adjacent apparatus that can directly communicate with the communication apparatus.

Moreover, the communication apparatus of the present invention may further comprises a measurement section for measuring, at a plurality of timings, bandwidths that can be used in communication between the communication apparatus and the adjacent apparatus. In this case, the route state of a route may include bandwidths that can be used in communication between each of pairs of communication apparatuses present on the route, the bandwidths being included so as to correspond to the pair of communication apparatuses. In addition, the updating section may calculate, as the route evaluation value, a bandwidth that can be used on an entire route from the source apparatus to the communication apparatus, based on: bandwidths that can be used in communication between each of pairs of communication apparatuses present on the route from the source apparatus to the immediately preceding relay apparatus, the bandwidths being written in the received route request packet; and the bandwidths, measured by the measurement section, that can be used in communication between the communication apparatus and the immediately preceding relay apparatus. Then, the updating section may calculate the route evaluation value such that the larger the bandwidth that can be used on the entire route is, the higher the route evaluation value is.

In addition, the above-described measurement section may measure, at a plurality of timings, bandwidths that can be used in communication between the communication apparatus and the adjacent apparatus, and obtain a minimum value from among the measured bandwidths. In this case, the route state of a route may include a minimum value of bandwidths that can be used between respective pairs of communication apparatuses present on the route. In addition, the updating section may compare the minimum value of bandwidths that can be used between respective pairs of communication apparatuses from the source apparatus to the immediately preceding relay apparatus, the minimum value being written in the received route request packet, with the minimum value of bandwidths, measured by the measurement section, that can be used between the communication apparatus and the immediately preceding relay apparatus, and thereby the updating section may calculate, as the route evaluation value, a minimum value of bandwidths on an entire route from the source apparatus to the communication apparatus. Then, the updating section may calculate the route evaluation value such that the larger the bandwidth that can be used on the entire route is, the higher the route evaluation value is.

In addition, the above-described measurement section may measure an elapsed time period, to a present time, from the latest time at which a state between the communication apparatus and the adjacent apparatus has changed from a state in which communication cannot be performed to a state in which communication can be performed. In this case, the route state of a route may include a minimum value of the elapsed time periods measured by respective communication apparatuses on the route. In addition, the updating section may compare the minimum value of the elapsed time periods measured between respective pairs of communication apparatuses from the source apparatus to the immediately preceding relay apparatus, the minimum value being written in the received route request packet, with the elapsed time period measured between the communication apparatus and the immediately preceding relay apparatus by the measurement section, and thereby the updating section may calculate a minimum value of the elapsed time period corresponding to an entire route from the source apparatus to the communication apparatus. Then, the updating section may calculate the route evaluation value such that the longer the calculated minimum value is, the higher the route evaluation value is.

In addition, the route state of a route may include the number of hops on the route. In this case, the updating section may calculate, as the route evaluation value, the number of hops on the route from the source apparatus to the communication apparatus by adding 1 to the number of hops on the route from the source apparatus to the immediately preceding relay apparatus, the number of hops being written in the received route request packet. In addition, the updating section may calculate the route evaluation value such that the smaller the calculated number of hops is, the higher the route evaluation value is.

Moreover, the route state of a route from the source apparatus to the immediately preceding relay apparatus may include the number of hops on the route. In this case, a calculation section may calculate, as a second route evaluation value, the number of hops on the route from the source apparatus to the communication apparatus by adding 1 to the number of hops on the route from the source apparatus to the immediately preceding relay apparatus, the number of hops being written in the received route request packet. In addition, the updating section may calculate a second route evaluation value such that the smaller the calculated number of hops is, the higher the second route evaluation value is. Then, the control section may select the predetermined number of route request packets in descending order starting from the route request packet including the highest second route evaluation value, if the number of route request packets including the same route evaluation value is equal to or larger than the predetermined number, the route evaluation values being calculated by the updating section.

In addition, when the route request packet is received, the control section may set the predetermined waiting time period in accordance with the route evaluation value. Moreover, the control section may set the predetermined waiting time period such that the lower the route evaluation value is, the longer the predetermined waiting time period is.

Moreover, if an expiry time of a waiting time period set based on a latest received route request packet is earlier than an expiry time of the predetermined waiting time period set based on a previously received route request packet, the control section may reduce the predetermined waiting time period to the waiting time period set based on the latest received route request packet, and may transmit a route request packet at the expiry time of the waiting time period set based on the latest received route request.

Moreover, when the route request packet is received for the second or subsequent time, the control section may determine whether or not the number of route request packets that have been received is equal to a predetermined threshold value, and when the control section determines that the number of route request packets that have been received is equal to a predetermined threshold value, the control section may transmit a route request packet.

In addition, the route state of a route from the source apparatus to the immediately preceding relay apparatus may include the number of hops on the route. In this case, the calculation section may further calculate the number of hops on the route from the source apparatus to the communication apparatus by adding 1 to the number of hops on the route from the source apparatus to the immediately preceding relay apparatus, the number of hops being included in the route state. In addition, the control section may determine whether or not a first condition is satisfied and whether or not a second condition is satisfied, the first condition being that the number of hops calculated by the updating section is larger than the number of hops calculated from a previously received route request packet, the second condition being that the route evaluation value calculated from a latest received route request packet is lower than the route evaluation value calculated from the previously received route request packet, and when the control section determines that both the first condition and the second condition are satisfied, the control section may transmit a route request packet.

In addition, when the control section determines that the first condition is satisfied and that the second condition is not satisfied, the control section may extend the predetermined waiting time period to a waiting time period set based on the latest received route request packet, and may transmit a route request packet when the waiting time period set based on the latest received route request packet expires.

In addition, if the predetermined waiting time period is extended, the control section may transmit, at an expiry time of the predetermined waiting time period yet to be extended, a route request packet selected at the time, and may further transmit, at an expiry time of the extended time period, a route request packet selected at the time.

In addition, the control section may immediately transmit a firstly received route request packet to the adjacent apparatus, and after the predetermined waiting time period expires, the control section may select the predetermined number of route request packets in descending order starting from the route request packet including the highest route evaluation value, the predetermined number of route request packets being selected from among route request packets that include the same information indicating the source apparatus and the same information indicating the destination apparatus as those included in the firstly received route request packet.

In addition, the control section may collectively write, in one route request packet, information written in the selected route request packets.

In addition, the source apparatus may write, in the route request packet, information indicating the number of routes, which is the predetermined number.

In addition, the control section may discard the route request packet received after the predetermined waiting time period expires.

A second aspect of the present invention is a communication method of, when a source apparatus which requests start of communication communicates by multihop with a destination apparatus which is a destination, transmitting a route request packet for creating a route, to relay apparatuses such that the route request packet arrives at the destination apparatus, the communication method comprising: a step of receiving, from at least one immediately preceding relay apparatus among the relay apparatuses, that has directly transmitted the route request packet to the communication apparatus, the route request packet that includes information indicating the source apparatus, information indicating the destination apparatus, and a route state of a route from the source apparatus to the immediately preceding relay apparatus; a step of calculating a route evaluation value indicating the route state of a route from the source apparatus to the communication apparatus, based on: the route state of the route from the source apparatus to the immediately preceding relay apparatus, the route state of the route being written in the received route request packet; and the route state of a route from the immediately preceding relay apparatus to the communication apparatus, and updating the route request packet by writing the route state of a route from the source apparatus to the communication apparatus in the route request packet; and a step of: when the route request packet is received, setting a predetermined waiting time period starting from a time at which the route request packet is received, selecting a predetermined number of route request packets in descending order starting from the route request packet including the highest route evaluation value, from among route request packets received within the waiting time period, the route request packets received including the same information indicating the source apparatus and the same information indicating the destination apparatus as those included in the received route request packet; and transmitting the selected predetermined number of route request packets to an adjacent apparatus that can directly communicate with the communication apparatus.

According to the present invention, a communication apparatus sets a predetermined waiting time period, based on a received route request packet. The communication apparatus selects a predetermined number of route request packets having as high route evaluation values as possible, the route evaluation values having been updated by an updating section, the predetermined number of route request packets being selected from among route request packets which include the same information indicating the source apparatus and the same information indicating the destination apparatus as the received route request packet include, and which have been received within the predetermined waiting time period, and the communication apparatus transmits the selected route request packets to an adjacent apparatus. Therefore, a route having a high route evaluation value, which indicates a state of the route, can be created between a predetermined source apparatus and a predetermined destination apparatus while the number of route request packets to be transmitted for creating a route is reduced and consumption of bandwidth is suppressed.

BRIEF DESCRIPTION OF DRAWINGS

FIG. 2 is a diagram showing a measured value management table.

DETAILED DESCRIPTION OF INVENTION

First Embodiment

In the present embodiment, when a source apparatus that requests start of communication searches for a route suitable to a data type used in the communication to be started, a relay apparatus does not broadcast all received route request packets, but broadcasts route request packets that have passed through routes having high route evaluation values, the number of the route request packets being set by the source apparatus. The route evaluation value is a parameter used for selecting a route request packet. When a plurality of route request packets arrive at a relay apparatus respectively via different routes from the source apparatus, the route evaluation values indicate the respective states of routes through which the route request packets have passed.

For convenience of description, firstly, the format of a route request packet will be described with reference to FIG. 3, before the function of a communication apparatus according to the first embodiment of the present invention is described.

Figure 3:
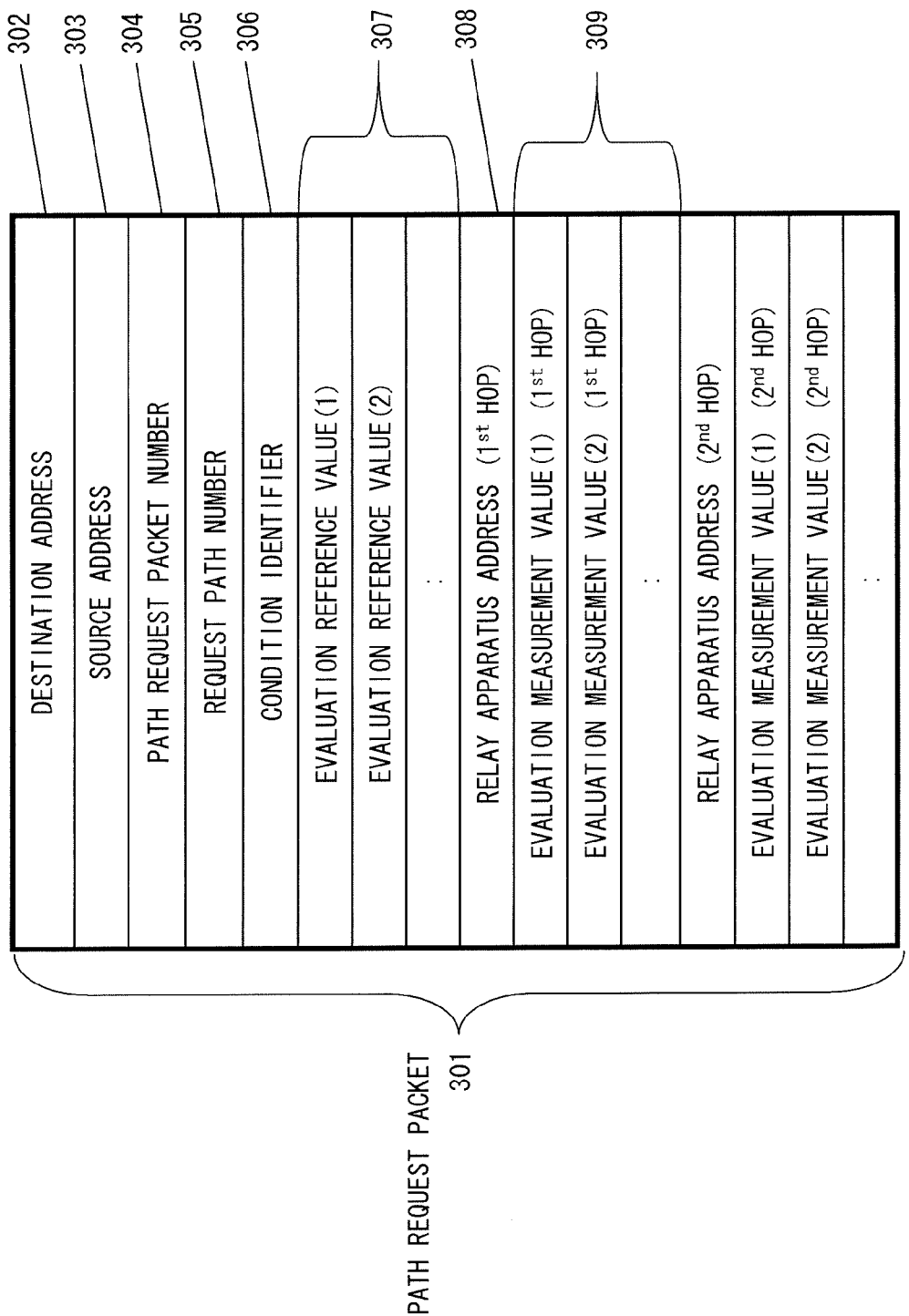
FIG. 3 is a diagram showing a frame format of a route request packet.

FIG. 3 is a data format diagram of a route request packet. A route request packet 301 includes a destination address 302, a source address 303, a route request packet number 304, a request route number 305, a condition identifier 306, an evaluation reference value 307, a relay apparatus address 308, and an evaluation measurement value 309.

The destination address 302 indicates the address of a destination apparatus that is a connection destination with which a source apparatus requests to communicate. The source address 303 indicates the address of the source apparatus. The route request packet number 304 is a value for discriminating route request packets transmitted from the same source apparatus.

The request route number 305 is the number of routes to be set by the source apparatus, and is set at an integer number equal to or larger than "1". However, when the destination apparatus returns a route to the source apparatus, the request route number is set to "0" since it is not necessary to request a route.

The condition identifier 306 is a parameter for specifying a condition used for searching for a route, and is set by the source apparatus. Each communication apparatus changes a condition to be selected, based on the condition identifier 306. In the present embodiment, the following six types are used as examples of the condition identifier.

Condition identifier "1": which is used for searching, based on the latest communication state, for a route having the maximum bandwidth Condition identifier "2": which is used for searching, based on the history of the past communication states, for a route on which it is assured that the minimum value of the bandwidth is equal to or larger than a certain value Condition identifier "3": which is used for searching for a route on which a delay caused until a packet arrives at the destination apparatus after the packet is transmitted from the source apparatus is minimum Condition identifier "4": which is used for searching for a route having a minimum number of hops Condition identifier "5": which is used for searching, based on the latest communication state, for a route on which it is assured that a communication duration time between each pair of relay apparatuses present on the route is equal to or larger than a certain value Condition identifier "6": which is used for searching at the same time, based on the history of the past communication states, for a route on which it is assured that the minimum value of the bandwidth is equal to or larger than a certain value, and for a route having a minimum number of hops The evaluation reference value 307 is a value calculated in accordance with a set value of the condition identifier 306. The evaluation reference value 307 is used for evaluating a route. The evaluation reference value 307 is used for comparing a plurality of routes through which the route request packets have passed, with each other, the route request packets having the same source address 303 and the same route request packet number 304. For example, when the condition identifier is set at "1", the evaluation reference value 307 is the bandwidth of communication on a route from the source apparatus to a communication apparatus that has received the route request packet, the bandwidth being estimated based on the latest communication state between each pair of relay apparatuses present on the route.

When the condition identifier is set at "2", the evaluation reference value 307 is the smallest value, of the minimum values of respective sets of bandwidths, each set of bandwidths being measured between each pair of relay apparatuses on the routes during a past certain period.

When the condition identifier is set at "3", the evaluation reference value 307 is a time at which the source apparatus transmits a route request packet. In this case, by synchronizing clocks of all communication apparatuses present in a network in advance, each communication apparatus can select a route request packet, based on a time difference between a time at which the route request packet arrives and a time indicated by the evaluation reference value 307.

When the condition identifier is set at "4", the evaluation reference value 307 is the number of hops taken from the source apparatus.

When the condition identifier is set at "5", the evaluation reference value 307 is the smallest value, of communication duration times each of which is a time period, to the present time, from the latest time at which the state between each pair of relay apparatuses on a route has changed from a state in which communication cannot be performed to a state in which communication can be performed.

Moreover, as in the case where the condition identifier is set at "6", when a plurality of routes which satisfy different conditions are searched for at the same time, the route request packet 301 has a plurality of the evaluation reference values 307. In FIG. 3, a plurality of the evaluation reference values 307 are represented as an evaluation reference value (1), an evaluation reference value (2), or the like. When the condition identifier is set at "6", the evaluation reference value (1) is the number of hops, and the evaluation reference value (2) is the smallest value, of the minimum values of respective sets of bandwidths, each set of bandwidths being measured between each pair of relay apparatuses on the routes during a past certain period. Thus, a plurality of routes that satisfy different conditions can be set at the same time upon a single search for a route.

The relay apparatus address 308 is the address of a relay apparatus, through which the route request packet has passed, present on the route from the source apparatus to a communication apparatus that has received the route request packet. The evaluation measurement value 309 is information indicating the state of communication, which is measured between each relay apparatus and the immediately preceding relay apparatus (one hop before said each apparatus). The relay apparatus address 308 and the evaluation measurement value 309 are added every time the route request packet is relayed by a relay apparatus. For convenience of processing, it is desirable that the evaluation measurement value 309 is stored in the route request packet 301 so as to correspond to the evaluation reference value 307. In FIG. 3, the evaluation measurement values 309 are represented as an evaluation measurement value (1) and an evaluation measurement value (2) respectively correspond to the evaluation reference value (1) and the evaluation reference value (2), which are the evaluation reference values 307.

The route request packet described above is used for a source apparatus to search for a route, and in addition, used for a destination apparatus to return, to the source apparatus, information about the route. Hereinafter, a route request packet that is used for the destination apparatus to return, to the source apparatus, information about the route, is referred to as a return route request packet. The format of the return route request packet is the same as the above-described format of the route request packet, except that the source address and the destination address are replaced by each other and that the request route number is set at "0".

Figure 1:
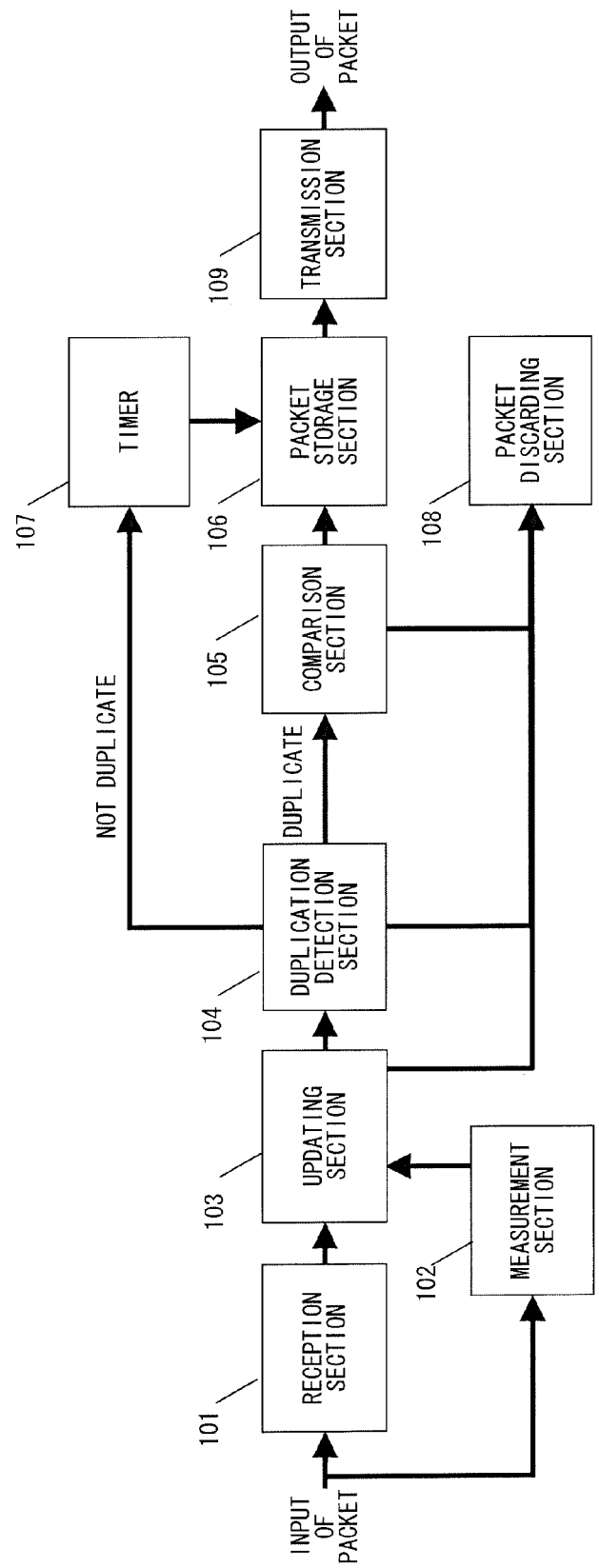
FIG. 1 is a function block diagram of a communication apparatus of a first embodiment.

Next, the configuration of the functions of the communication apparatus according to the first embodiment of the present invention will be described in detail. FIG. 1 is a function block diagram of the communication apparatus according to the first embodiment of the present invention. Referring to FIG. 1, the communication apparatus according to the present embodiment includes a reception section 101, a measurement section 102, an updating section 103, a duplication detection section 104, a comparison section 105, a packet storage section 106, a timer 107, a packet discarding section 108, and a transmission section 109.

The reception section 101 outputs a route request packet to the updating section 103, from data packets received by using various communication methods. The measurement section 102 measures information necessary for calculating a route evaluation value, and then updates a measured value management table 201 (the details thereof is described later). In the present embodiment, the information necessary for calculating a route evaluation value includes a bandwidth of communication between the communication apparatus and the adjacent apparatus (apparatus that can directly communicate with the communication apparatus), and a communication duration time, which is a time period, to the present time, from the latest time at which the state between the communication apparatus and the adjacent apparatus has changed from a state in which communication cannot be performed to a state in which communication can be performed. The measurement section 102 measures a reception electric power with respect to packets transmitted by the adjacent apparatus located at the location where the communication apparatus can directly communicate with the adjacent apparatus, the packets including not only a route request packet but also a packet other than route request packet, and the measurement section 102 estimates the bandwidth of communication between the communication apparatus and the adjacent apparatus that has transmitted the packets. The bandwidth mentioned here is a parameter representing a communication rate of data, such as a PHY (Physical Layer) rate, an MAC (Media Access Control) rate, or a throughput. The transmission section 109 transmits, at regular time intervals or at any timing, a Hello packet indicating that the communication apparatus is present on the network, and then receives the Hello packet, thereby measuring a communication duration time. Thereafter, the measured bandwidth and the measured communication duration time are separately stored in the measured value management table 201.

FIG. 2 is a diagram showing an example of the measured value management table. The measured value management table 201 includes, for each adjacent apparatus, an adjacent apparatus address 202, a latest measurement value 203, a stored measurement value 204, an average measurement value 205, and a minimum measurement value 206. The adjacent apparatus address 202 is the address of the adjacent apparatus that has transmitted the packet, the address being written in the header of the received packet. The latest measurement value 203 is the latest one of measurement values which are measured, for each adjacent apparatus, by the measurement section 102 of the communication apparatus. The stored measurement values 204 are a certain number of measurement values stored in the order of the latest value, the certain number of measurement values being measured, for each adjacent apparatus, by the measurement section 102 of the communication apparatus. Note that the number of the measurement values stored as the stored measurement values 204 can be changed based on frequency of the bandwidth variation, or accuracy necessary for estimating the bandwidth. In addition, the number of the measurement values stored as the stored measurement values 204 may be different among adjacent apparatuses. The average measurement value 205 is the average value of the certain number of measurement values stored as the stored measurement value 204. The minimum measurement value 206 is the minimum value of the certain number of measurement values stored as the stored measurement value 204. For example, when the minimum value of the bandwidth is stored as the minimum measurement value 206, the minimum measurement value 206 serves as an index for determining the degree of the bandwidth that can be assured when the state of a transmission route between a pair of communication apparatuses is worst. Note that the minimum measurement value 206 does not need to be the minimum value of the bandwidths stored as the stored measurement value 204. The minimum measurement value 206 may be the minimum value of measurement values estimated during a certain time period.

If a received route request packet is the route request packet that has been transmitted from the communication apparatus in the past, the updating section 103 outputs the received route request packet to the packet discarding section 108 to discard the received route request packet. On the other hand, if a received route request packet is not the route request packet that has been transmitted from the present communication apparatus in the past, the updating section 103 updates the received route request packet by adding the result of measurement performed by the measurement section 102 to the received route request packet, and calculates the route evaluation value. Processing of updating a route request packet and processing of calculating a route evaluation value will be described later. After updating the received route request packet, the updating section 103 outputs, to the duplication detection section 104, the updated route request packet and the corresponding route evaluation value.

The duplication detection section 104 determines whether or not the route request packet outputted from the updating section 103 is a duplicately received route request packet, based on a duplication management table (the details thereof is described later). After the determination, the duplication detection section 104 outputs, to the comparison section 105, a duplicately received route request packet and the corresponding route evaluation value, and outputs, to the timer 107, a route request packet other than a duplicately received route request packet, and the corresponding route evaluation value.

Figure 4:
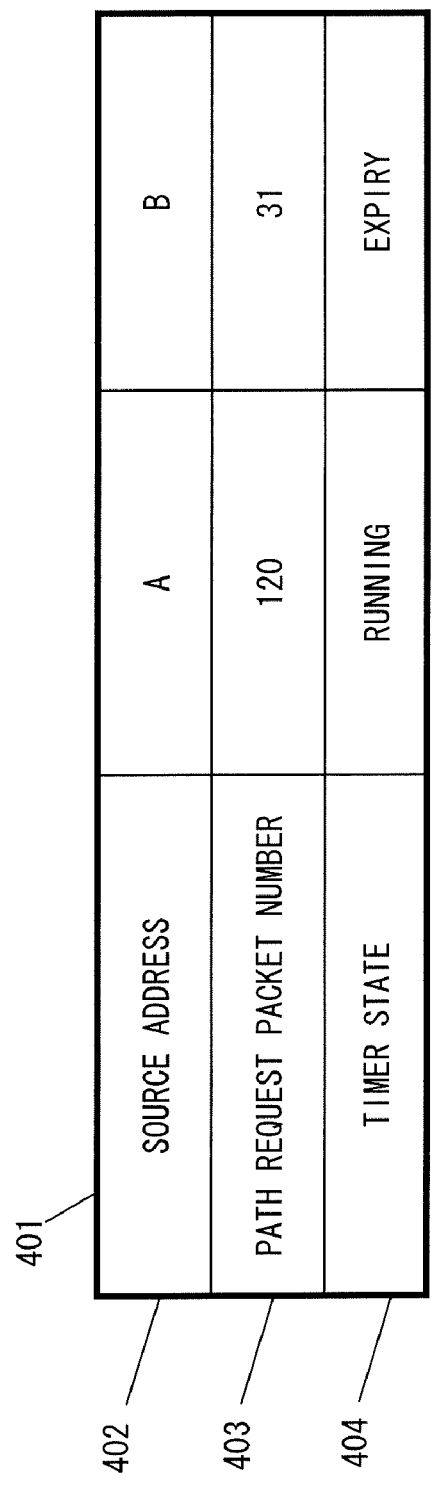
FIG. 4 is a diagram showing a duplication management table.

FIG. 4 is a diagram showing the duplication management table. The duplication management table 401 stores a source address 402, a route request packet number 403, and a timer state 404, for each source apparatus. The address of the source apparatus, included in the received route request packet, is stored as the source address 402. The route request packet number included in the received route request packet is stored as the route request packet number 403. It is stored as the timer state 404, whether, in the timer 107 (the details thereof is described later), a timer is running or expires. The details of processing of the determination performed by the duplication detection section 104 with use of the duplication management table 401 will be described later.

With reference to: the route evaluation value for the route request packet outputted from the duplication detection section 104; and route evaluation values for all route request packets stored by the packet storage section 106 (the details thereof is described later), the comparison section 105 determines whether to output the route request packet outputted from the duplication detection section 104, and the corresponding route evaluation value to the packet storage section 106, or to output the route request packet and the corresponding route evaluation value to the packet discarding section 108 to discard them. The details of operation of the comparison section 105 will be described later.

The packet storage section 106 stores route request packets outputted from the comparison section 105 and the timer 107. In addition, it is desirable that the packet storage section 106 stores the corresponding route evaluation values together with the route request packets. If storing a route request packet causes the number of stored route request packets to exceed the request route number 305 included in the route request packets, the packet storage section 106 updates a packet having a minimum route evaluation value among the stored route request packets. If route request packets are transmitted by a plurality of source apparatuses, the packet storage section 106 secures areas for respective source addresses, in which the respective route request packets are stored.

Based on the condition identifier 306 included in the route request packet outputted from the duplication detection section 104, and on the corresponding route evaluation value, the timer 107 calculates a waiting time period from when the route request packet is received to when a route request packet stored in the packet storage section 106 is transmitted. The waiting time period is calculated such that the higher the route evaluation value for the route request packet is, the shorter the waiting time period is. In addition, the waiting time period may be a time obtained by adding, to a time taken for a route request packet to proceed by one hop, a time proportional to or inversely proportional to a route evaluation value, or a value that gradually varies in accordance with a route evaluation value, in order for each relay apparatus to receive another route request packet that has passed through one extra relay apparatus by using one extra hop.

After calculating the waiting time period, the timer 107 starts a timer counting up to the waiting time period. Thereafter, the timer 107 outputs the route request packet to the packet storage section 106. Moreover, when the waiting time period expires, the timer 107 causes the transmission section 109 to transmit the route request packet. The details of operation of the timer 107 will be described later.

The packet discarding section 108 discards route request packets outputted from the updating section 103 the duplication detection section 104, and the comparison section 105.

The transmission section 109 transmits a data packet by various communication methods. Note that processing performed by the transmission section 109 varies depending on which the communication apparatus is, a source apparatus, a relay apparatus, or a destination apparatus. If the communication apparatus is a source apparatus, the transmission section 109 newly generates and broadcasts a route request packet. If the communication apparatus is a relay apparatus, the transmission section 109 broadcasts a packet stored in the packet storage section 106 when the timer expires. If the communication apparatus is a destination apparatus, the transmission section 109 generates a return route request packet by replacing the destination address and the source address of a received route request packet by each other, and setting the request route number to "0". Then, the transmission section 109 returns the generated return route request packet to the source apparatus by unicast via a route through which the route request packet has been relayed.

Figure 5:
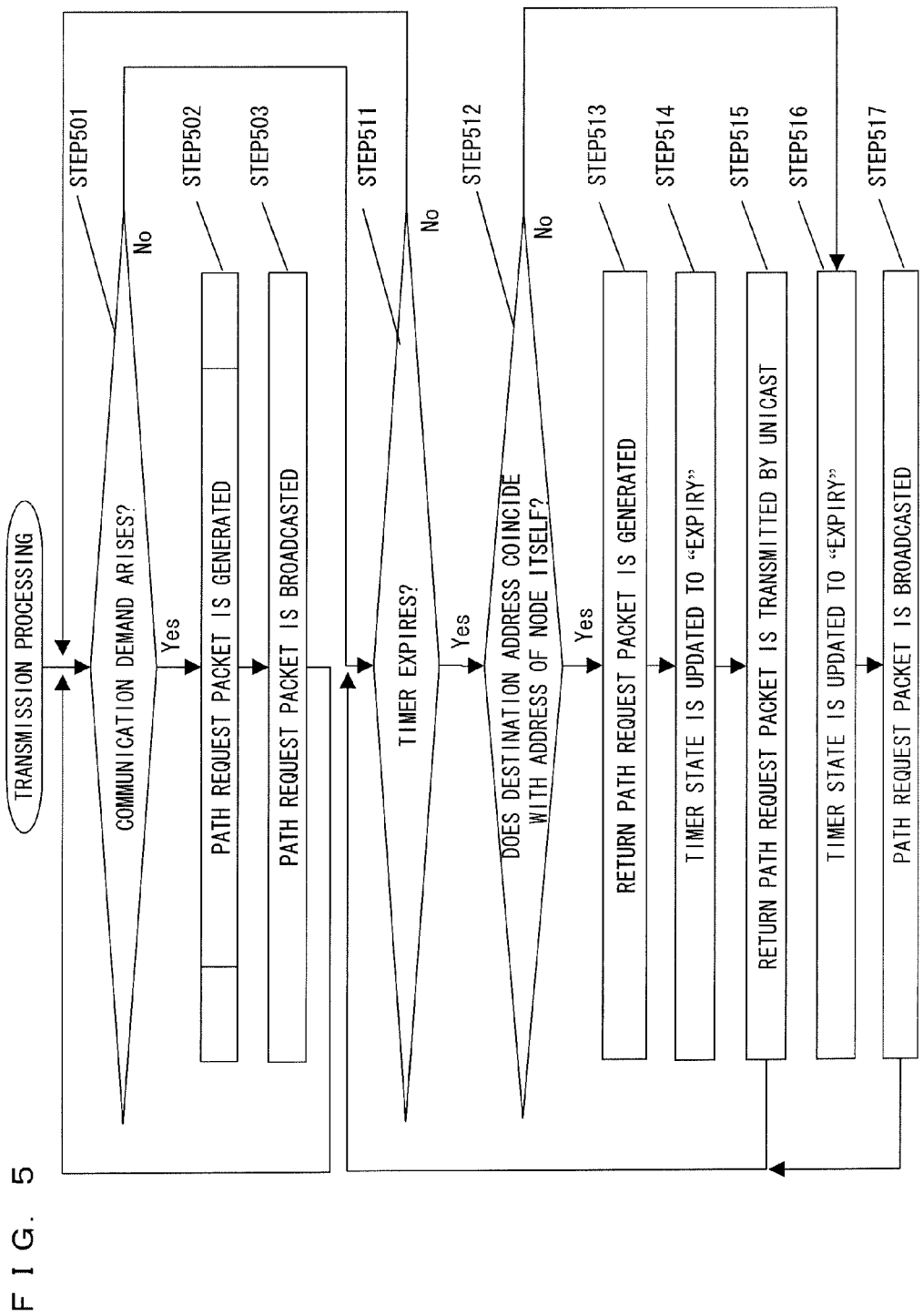
FIG. 5 is a flowchart showing a route request packet transmission processing performed by the communication apparatus of the first embodiment.

Operation of the communication apparatus having the above configuration will be described with reference to FIG. 5 to FIG. 8. Firstly, a sequence of steps of processing performed until the communication apparatus transmits a route request packet will be described. FIG. 5 is a flowchart showing the processing.

First, the communication apparatus determines whether or not a communication demand has arisen, the communication demand indicating that the communication apparatus needs to communicate with another communication apparatus (STEP 501). If the communication apparatus determines that a communication demand has arisen, the communication apparatus generates a route request packet for searching a route (STEP 502).

Figure 6:
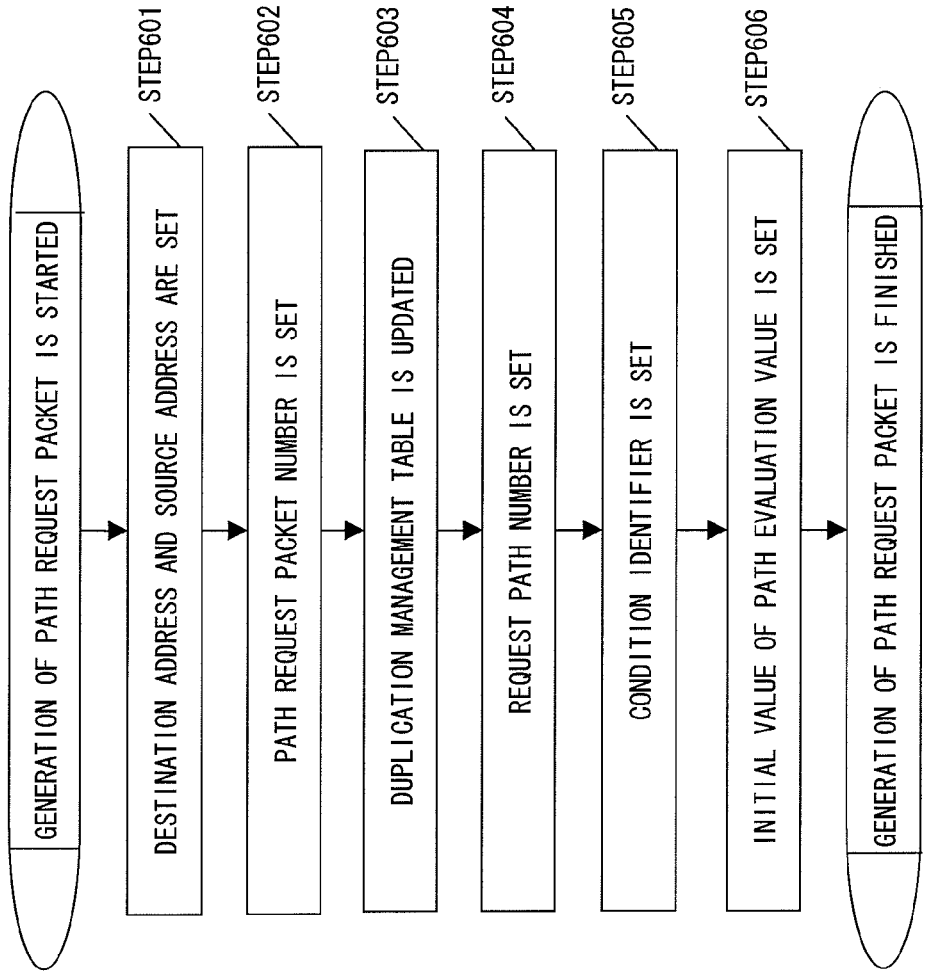
FIG. 6 is a flowchart showing route request packet generation processing performed by a source apparatus.

FIG. 6 is a flowchart showing route request packet generation processing performed in STEP 502. First, the transmission section 109 sets the address of a destination apparatus, which is a connection destination, as the destination address of a route request packet to be newly generated, and sets the address of the communication apparatus, as the source address of the route request packet (STEP 601). Next, the transmission section 109 obtains, from the duplication management table 401, a route request packet number 403 corresponding to the same source address 402 as the address of the communication apparatus. Then, the transmission section 109 sets a value obtained by incrementing the obtained number, as the route request packet number 304 of the route request packet to be newly generated (STEP 602). Then, the transmission section 109 increments the route request packet number 403 in the duplication management table 401, whereby the duplication management table 401 is updated (STEP 603). Then, the transmission section 109 sets the request route number 305 in accordance with a network size (STEP 604). Moreover, the transmission section 109 sets the condition identifier 306 in accordance with the type of data to be communicated (STEP 605). Finally, the transmission section 109 prepares an area for a necessary number of evaluation reference values 307 in accordance with the condition identifier, and initializes a parameter other than parameters set in STEP 601 to STEP 605, to "0" or a transmission time of the route request packet (STEP 606).

When a route request packet is generated in STEP 502, the transmission section 109 broadcasts the route request packet (STEP 503), and then executes processing in STEP 501.

Figure 7:
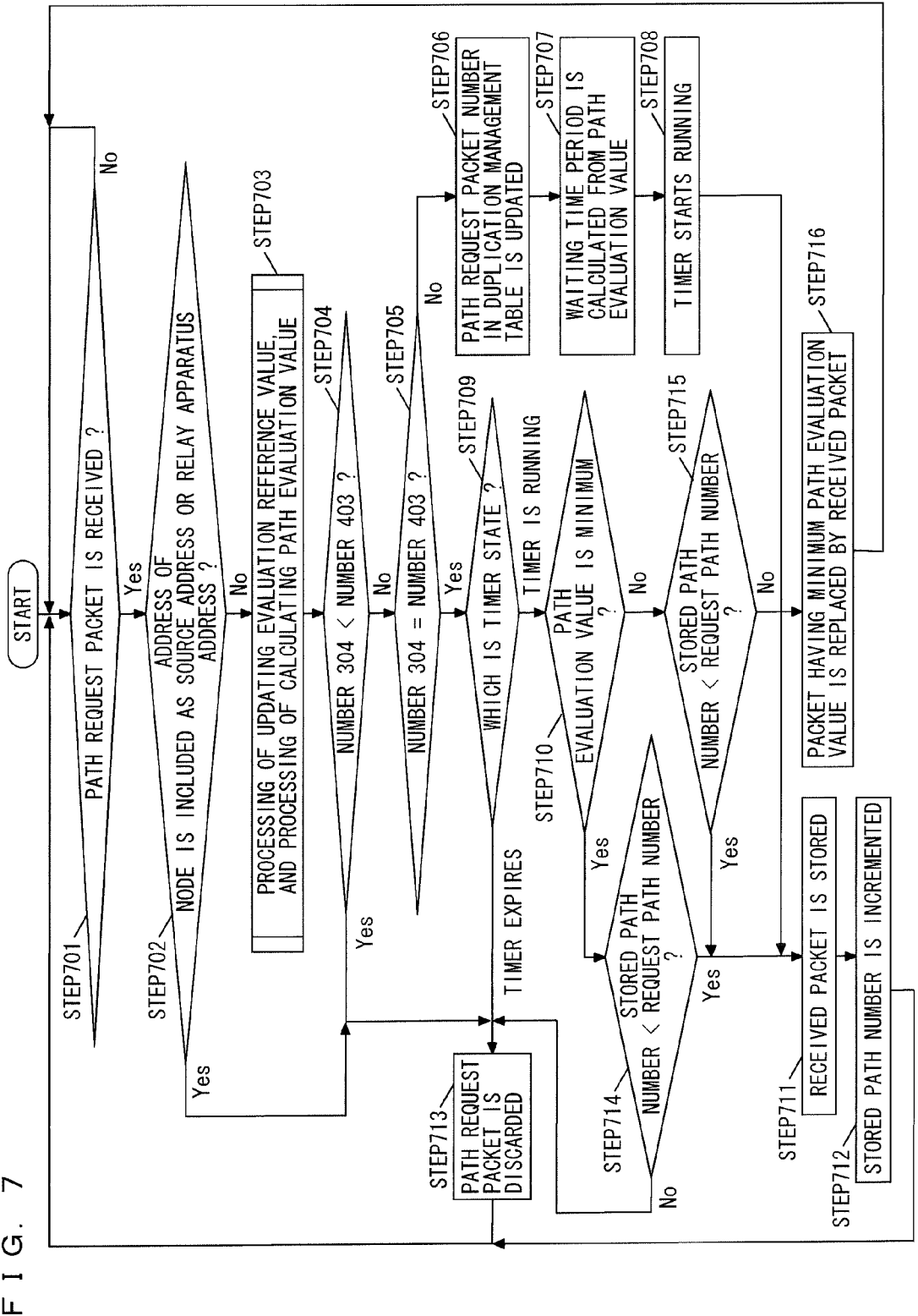
FIG. 7 is a flowchart showing route request packet reception processing performed by the communication apparatus of the first embodiment.

Next, a sequence of steps of processing performed after the communication apparatus receives a route request packet will be described. FIG. 7 is a flowchart showing the processing.

First, the reception section 101 determines whether or not a data packet received by the reception section 101 is a route request packet (STEP 701). If the received data packet is not a route request packet (No in STEP 701), the reception section 101 repeats processing in STEP 701 until the reception section 101 receives a route request packet. On the other hand, if the received data packet is a route request packet (Yes in STEP 701), the following steps of processing are executed in sequence.

The updating section 103 determines whether or not the address of the communication apparatus is present as the source address 303 or the relay apparatus address 308 included in the received route request packet (STEP 702). If the address of the communication apparatus is present as the source address 303 or the relay apparatus address 308 (Yes in STEP 702), the updating section 103 determines that the received route request packet has passed through the communication apparatus in the past, or that the received route request packet has been generated by the communication apparatus in the past, and outputs the received route request packet to the packet discarding section 108 to discard the received route request packet (STEP 713). On the other hand, the address of the communication apparatus is not present as the source address 303 or the relay apparatus address 308 (No in STEP 702), the updating section 103 determines that the received route request packet has not passed through the communication apparatus in the past, and performs the following updating processing for the route request packet.

After the route request packet is received, the updating section 103 updates an evaluation reference value included in the route request packet, and calculates a route evaluation value (STEP 703). Processing of updating the evaluation reference value and processing of calculating the route evaluation value will be described later.

Next, the duplication detection section 104 obtains, from the duplication management table 401, the route request packet number 403 corresponding to the source address 303 included in the route request packet outputted from the updating section 103. Then, the duplication detection section 104 determines whether or not the route request packet number 304 of the route request packet outputted from the updating section 103 is smaller than the obtained route request packet number 403 (STEP 704). If the route request packet number 304 is smaller than the route request packet number 403 (Yes in STEP 704), since the received route request packet has been used for searching a route in the past, the duplication detection section 104 outputs the route request packet to the packet discarding section 108 to discard the route request packet (STEP 713).

If the route request packet number 304 is not smaller than the route request packet number 403 (No in STEP 704), the duplication detection section 104 determines whether or not the route request packet number 304 is equal to the route request packet number 403 (STEP 705). If the route request packet number 304 is not equal to the route request packet number 403, that is, if the route request packet number 304 is larger than the route request packet number 403 (No in STEP 705), the duplication detection section 104 determines that the route request packet has been received for the first time. Then, the duplication detection section 104 updates the route request packet number 403 in the duplication management table 401 to a value equal to the route request packet number 304 included in the received route request packet (STEP 706). Next, the timer 107 calculates a waiting time period, based on the condition identifier 306 of the route request packet outputted from the duplication detection section 104, and the route evaluation value for the route request packet (STEP 707). Then, the timer 107 updates a timer state in the duplication management table 401 to "Running", and starts a timer counting up to the calculated waiting time period (STEP 708). Thereafter, the packet storage section 106 stores the received route request packet (STEP 711). Moreover, the packet storage section 106 increments the number of stored routes (STEP 712). After STEP 712, processing in STEP 701 is executed.

On the other hand, if the route request packet number 304 is equal to the route request packet number 403 (Yes in STEP 705), the duplication detection section 104 determines that the route request packet is a duplicately received route request packet, and then determines whether the timer state 404 stored in the duplication management table 401 is "Running" or "Expiry" (STEP 709). If the timer state 404 is "Expiry"

("timer expires" in STEP 709), the duplication detection section 104 outputs the received route request packet to the packet discarding section 108 to discard the received route request packet (STEP 713). After the route request packet is discarded, processing in STEP 701 is executed.

If the timer state 404 is "Running" ("timer is running" in STEP 709), the comparison section 105 compares the route evaluation value of the received route request packet, with the route evaluation values of the route request packets stored in the packet storage section 106 (STEP 710).

If the route evaluation value of the received route request packet is lower than any one of the route evaluation values of the route request packets stored in the packet storage section 106 (Yes in STEP 710), the comparison section 105 determines whether or not the number of the route request packets stored in the packet storage section 106 is smaller than the request route number included in the received route request packet (STEP 714). If the comparison section 105 determines that the number of the route request packets stored in the packet storage section 106 is equal to the request route number (No in STEP 714), the comparison section 105 outputs the received route request packet to the packet discarding section 108 to discard the received route request packet (STEP 713). On the other hand, if the comparison section 105 determines that the number of the route request packets stored in the packet storage section 106 is smaller than the request route number (Yes in STEP 714), the comparison section 105 outputs the received route request packet to the packet storage section 106, and the packet storage section 106 stores the received route request packet (STEP 711). Moreover, the packet storage section 106 increments the number of stored routes (STEP 712). After STEP 712, the route request packet reception processing (STEP 70.1) is executed.

On the other hand, if the route evaluation value for the received route request packet is higher than one of the route evaluation values for the route request packets stored in the packet storage section 106 (No in STEP 710), the comparison section 105 determines whether or not the number of the route request packets stored in the packet storage section 106 is smaller than the request route number included in the received route request packet (STEP 715). If the comparison section 105 determines that the number of the route request packets stored in the packet storage section 106 is smaller than the request route number (Yes in STEP 715), the packet storage section 106 stores the route request packet (STEP 711), and increments the number of stored routes (STEP 712). Then, processing in STEP 701 is executed. On the other hand, if the comparison section 105 determines that the number of the route request packets stored in the packet storage section 106 is equal to the request route number (No in STEP 715), the comparison section 105 outputs the received route request packet to the packet storage section 106 and the packet storage section 106 replace a route request packet whose evaluation reference value 307 is minimum among the stored route request packets, by the received route request packet (STEP 716). After STEP 716, processing in STEP 701 is executed.

Next, the details of processing of updating an evaluation reference value and processing of calculating a route evaluation value, which are executed by the updating section 103 in STEP 703, will be described with reference to FIG. 8.

First, the updating section 103 obtains the address of the immediately preceding relay apparatus that has relayed the received route request packet, by one of the following methods (STEP 800).

Method 1: The updating section 103 obtains the last one of the relay apparatus addresses 308 written in the route request packet.

Method 2: If the communication apparatus is the first relay apparatus, the updating section 103 obtains the source address 303 instead of the relay apparatus address 308.

Method 3: If the address of a communication apparatus that has transmitted the route request packet is included in the packet header, the updating section 103 obtains the address as the address of the immediately preceding relay apparatus.

Next, the updating section 103 obtains the condition identifier 306 included in the received route request packet (STEP 801). Then, the updating section 103 adds the address of the communication apparatus that has received the route request packet, as the relay apparatus address 308 included in the received route request packet (STEP 802). Then, the updating section 103 switches the subsequent processing, in accordance with the value of the condition identifier 306 included in the received route request packet (STEP 803).

If the condition identifier is set at "1", the updating section 103 obtains, from the measured value management table 201, the latest measurement value 203 of the bandwidth corresponding to the same adjacent apparatus address 202 as the address of the immediately preceding relay apparatus (STEP 805). Next, the updating section 103 adds the obtained latest measurement value 203 as the last evaluation measurement value (1) in the received route request packet (STEP 806). Thereafter, the updating section 103 calculates the bandwidth corresponding to an entire route through which the received route request packet has passed, by using all the evaluation measurement value included in the received route request packet (STEP 807). The bandwidth of an entire route through which a route request packet has passed can be calculated by obtaining the multiplicative inverses of all the evaluation measurement values (1) included in the route request packet, and then obtaining the multiplicative inverse of the sum of the obtained multiplicative inverses. The updating section 103 updates the evaluation reference value (1) in the received route request packet to the calculated bandwidth (STEP 808). Finally, the updating section 103 calculates the route evaluation value, based on the evaluation reference value (1) (STEP 809). In this case, the updating section 103 calculates, as the route evaluation value, the evaluation reference value 307 or a value obtained by normalizing the evaluation reference value 307. Processing of updating an evaluation reference value and processing of calculating a route evaluation value are finished here.

If the condition identifier is set at "2" or "5", the updating section 103 obtains, from the measured value management table 201, the minimum measurement value 206 corresponding to the same adjacent apparatus address 202 as the address of the immediately preceding relay apparatus (STEP 810). Next, the updating section 103 obtains the evaluation reference value (1) included in the received route request packet (STEP 811). Thereafter, the updating section 103 compares the evaluation reference value (1) included in the received route request packet, with the minimum measurement value 206 (STEP 812). If the minimum measurement value 206 is lower than an evaluation reference value (1) (Yes in STEP 812), the updating section 103 updates the evaluation reference value (1) to a value equal to the minimum measurement value 206 (STEP 808). On the other hand, if the minimum measurement value 206 is higher than the evaluation reference value 307, the evaluation reference value (1) is not updated. Then, the updating section 103 calculates, as the route evaluation value, the evaluation reference value (1) or a value obtained by normalizing the evaluation reference value (1) (STEP 809). Processing of updating an evaluation reference value and processing of calculating a route evaluation value are finished here.

If the condition identifier is set at "3", the updating section 103 calculates, as the route evaluation value, the difference between a time at which the route request packet has arrived at the communication apparatus and a time indicated by the evaluation reference value, or calculates, as the route evaluation value, a value obtained by normalizing the difference (STEP 809), and then the processing is finished here.

If the condition identifier is set at "4", the updating section 103 obtains the evaluation reference value (1) included in the received route request packet, and increments the obtained value (STEP 804). Then, the updating section 103 updates the evaluation reference value (1) to the incremented value (STEP 808). Next, the updating section 103 calculates, as the route evaluation value, a value that increases if the number of hops decreases, for example, the multiplicative inverse of the number of hops, or a value obtained by normalizing the multiplicative inverse (STEP 809), and then the processing is finished here.

If the condition identifier is set at "6", the updating section 103 increments the evaluation reference value (1) of the evaluation reference values 307 included in the received route request packet (STEP 813). Next, the updating section 103 obtains, from the measured value management table 201, the minimum measurement value 206 corresponding to the same adjacent apparatus address 202 as the address of the immediately preceding relay apparatus (STEP 814). Then, the updating section 103 obtains the evaluation reference value (2) of the evaluation reference values 307 included in the received route request packet (STEP 815), and compares the minimum measurement value 206 with the evaluation reference value (2) (STEP 816). If the minimum measurement value 206 is lower than the evaluation reference value (2) (Yes in STEP 816), the updating section 103 updates the evaluation reference value (2) to a value equal to the minimum measurement value 206 (STEP 808). Then, the updating section 103 calculates the route evaluation value (1) and the route evaluation value (2) respectively corresponding to the updated evaluation reference value (1) and the updated evaluation reference value (2) (STEP 809), and then the processing is finished here. On the other hand, if the minimum measurement value 206 is higher than the evaluation reference value (2) (No in STEP 816), the updating section 103 calculates the route evaluation value (1) and the route evaluation value (2) respectively corresponding to the evaluation reference value (1) and the original evaluation reference value (2) (STEP 809), and then the processing is finished here.

On the other hand, if the communication apparatus determines that a communication request has not been made (No in STEP 501), the communication apparatus determines whether or not there is a route request packet the timer for which expires among route request packets stored in the packet storage section 106 (STEP 511). If the communication apparatus determines that there is not a route request packet the timer for which expires (No in STEP 511), the communication apparatus executes processing in STEP 501. On the other hand, the communication apparatus determines that there is a route request packet the timer for which expires (Yes in STEP 511), the communication apparatus executes processing in STEP 512.

If the communication apparatus determines that there is a route request packet the timer for which expires, the communication apparatus determines whether or not the destination address of the route request packet is the address of the communication apparatus (STEP 512). If the destination address is the address of the communication apparatus (Yes in STEP 512), the communication apparatus generates a return route request packet for returning information about a route to the source apparatus (STEP 513). Processing of generating the return route request packet is as follows. First, the communication apparatus replaces, in the route request packet whose destination address is the address of the communication apparatus, the destination address and the source address by each other. Next, the communication apparatus sets the request route number of the resultant route request packet to "0".

After generating the return route request packet, the communication apparatus updates the timer state 404 in the duplication management table 401 to "Expiry" (STEP 514). Then, the communication apparatus transmits the return route request packet by unicast (STEP 515), and executes processing in STEP 511.

On the other hand, if the destination address is not the address of the communication apparatus (No in STEP 512), the communication apparatus updates the timer state 404 in the duplication management table 401 to "Expiry" (STEP 516). Next, the communication apparatus broadcasts the route request packet stored in the packet storage section 106 (STEP 517) and executes processing in STEP 511.

Next, as an example of the present embodiment, an example in which the present invention is applied to a Power Line Communication (hereinafter, referred to as "PLC") network will be described with reference to FIG. 9 and FIG. 10. Note that the entirety or a part of the following disclosure can be applied to other types of network such as a wireless network.

Figure 9:
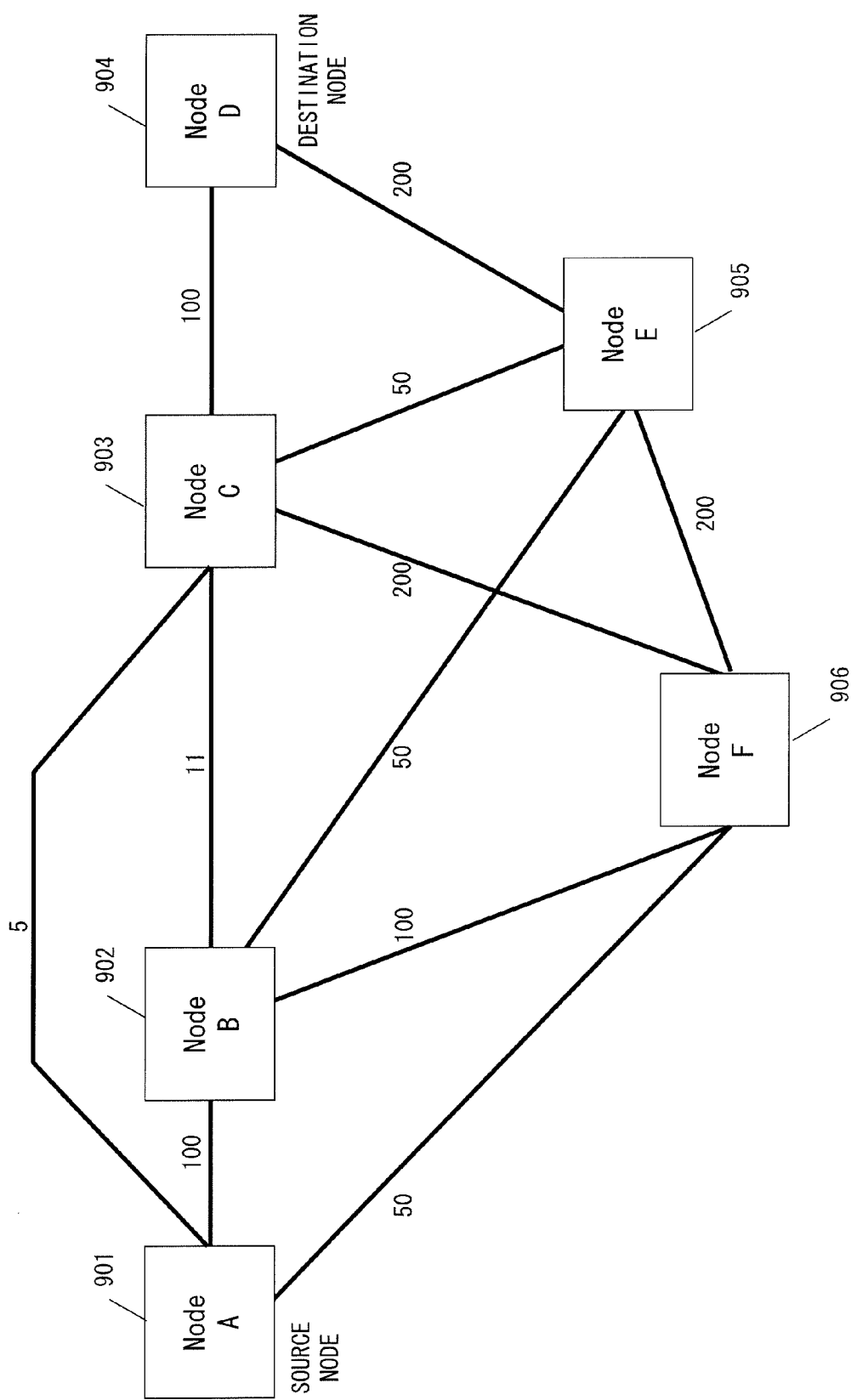
FIG. 9 is a network configuration diagram in the first embodiment.

FIG. 9 is a diagram showing a configuration of a network in the present embodiment. The network in the present embodiment includes communication apparatuses 901 to 906. For convenience of description, the communication apparatus 901 to 906 are respectively referred to as nodes A to F, the order of the numerals corresponding to the order of the alphabets. In addition, the addresses of the communication apparatuses 901 to 906 are respectively A to F, the order of the numerals corresponding to the order of the alphabets. In a PLC network, each communication apparatus is a PLC modem, and communicates an audio, a motion picture, normal data, or the like with other communication apparatuses.

In a PLC network, all the communication apparatuses are physically connected to each other via power lines. Therefore, a data signal transmitted on a power line is subject to distance attenuation or noise, and some pairs of communication apparatuses cannot directly communicate with each other. In FIG. 9, communication apparatuses that can directly communicate with each other are connected by solid lines. In addition, a numerical value written for each solid line indicates the latest bandwidth expected when a pair of apparatuses connected by the solid lines communicate with each other.

Hereinafter, an example in which the node A starts to communicate with the node D that cannot directly communicate with the node A will be described. Here, the node A is referred to as a source node and the node D is referred to as a destination node.

The node A designates a condition in accordance with the type of data to be communicated, and searches for a route. In the present embodiment, the following conditions are used as examples of conditions designated in accordance with the type of data. For audio data, the condition that the delay between a source node and a destination node is minimum or the condition that the number of hops taken between a source node and a destination node is minimum, is used. For motion picture data, the condition that the minimum assured bandwidth on a route is maximum is used. For normal data, the condition that the bandwidth on a route is maximum or the condition that a communication connection duration on a route is long, is used.

Figure 10:
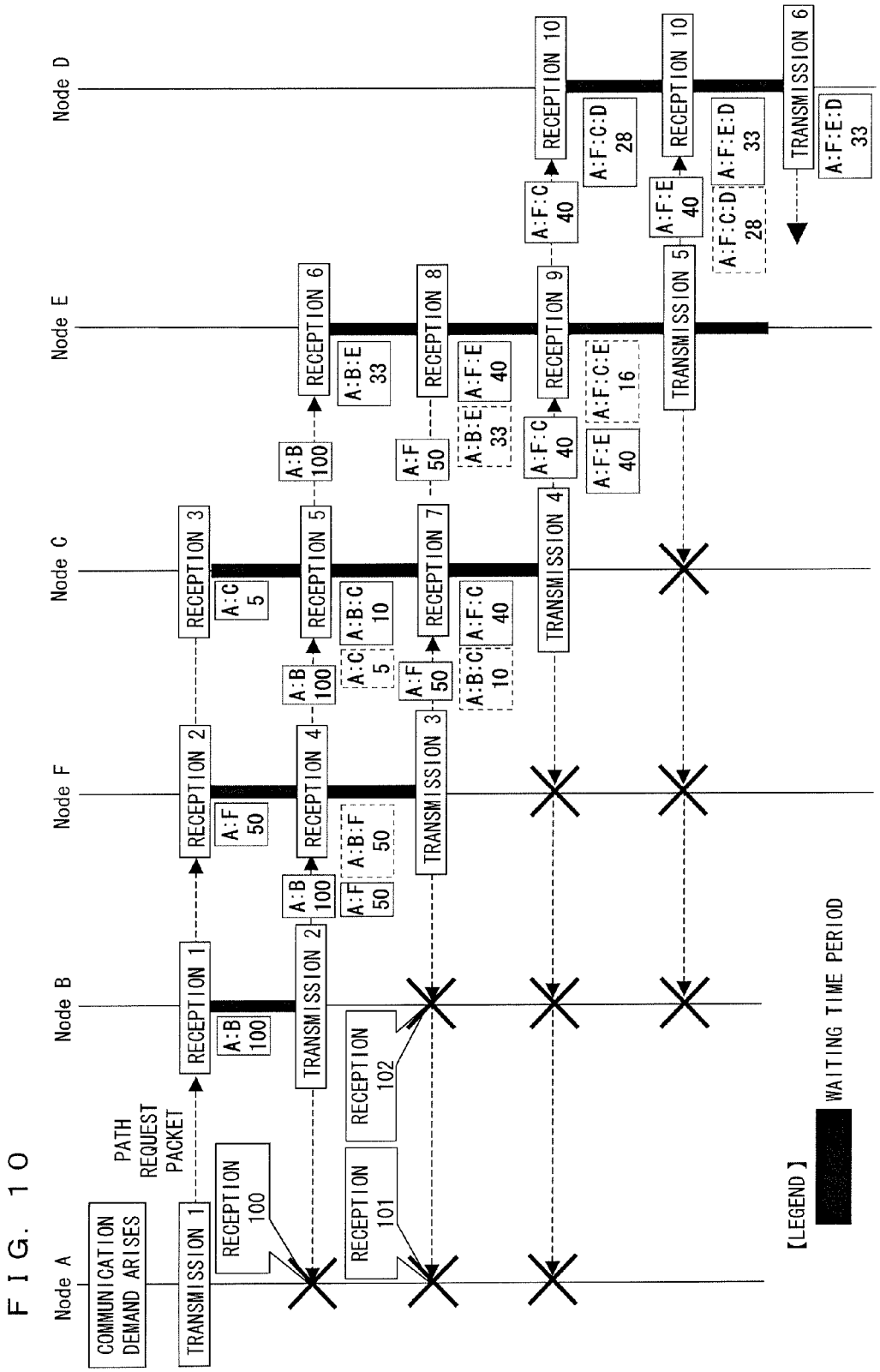
FIG. 10 is a sequence diagram showing the case where, in the first embodiment, data communication from the communication apparatus 901 to the communication apparatus 904 is requested.

FIG. 10 is a sequence diagram showing the case where, in the present embodiment, data communication demand from the node A to the node D arises and the node A searches for a route to the node D. In FIG. 10, transmission and reception written in frames respectively indicate transmission processing and reception processing on each node, and the identification numbers of the transmission processing and the reception processing are also written in the frames. Dotted arrows between the frames indicate that a route request packet is broadcasted. Characters and numerals enclosed by square frames indicate the contents of transmitted route request packets. The characters indicate the addresses (hereinafter, referred to as passed node addresses) of nodes from the source node to a node having received the route request packet, through which the transmitted route request packet has passed. The numerals indicate evaluation reference values for the routes through which the respective route request packets have passed. Note that a mark× written on a node to which a route request packet has been transmitted indicates that one of the updating section 103, the duplication detection section 104, and the comparison section 105 of the node has discarded the route request packet. In addition, a heavy line drawn between reception and transmission of a route request packet at each node indicates a waiting time period, which is shown as a legend. Moreover, the passed node address and the updated evaluation reference value of a route request packet that has been received and updated by each node, and the passed node address and the updated evaluation reference value of a route request packet that has been previously received by each node and is stored in the packet storage section 106, are indicated in frames positioned at the left of and below reception written at each node. Among the above route request packets, a route request packet to be stored in the packet storage section 106 after the updating is indicated in a solid line frame, and a route request packet to be discarded after the updating is indicated in a dotted line frame. Finally, a dashed dotted arrow extending from the node D indicates that a return route request packet is returned to the source node by unicast.

When a demand for starting communication has arisen, the node A creates a route request packet, based on the processing shown in FIG. 6, and transmits the route request packet to other nodes. Hereinafter, the details will be described under the condition that the route request packet transmitted by the node A is set such that the request route number is "1", the condition identifier is "1", and the route request packet number is "120".

When the node A transmits the route request packet (transmission 1), each of the nodes B, F, and C receives the route request packet (reception 1, reception 2, and reception 3). Each of the nodes B, F, and C updates the evaluation reference value of the received route request packet and calculates the route evaluation value for the received route request packet, based on the method shown in FIG. 8. First, since the condition identification value of the received route request packet is set at "1", each of the nodes B, F, and C obtains, from the measured value management table 201 in FIG. 2, the latest measurement value 203 of the bandwidth corresponding to the same adjacent apparatus address 202 as the address A, which is the address of the node A. Here, the latest bandwidth between each pair of nodes is as shown in FIG. 9, and therefore, the latest bandwidth obtained by the node B is 100, the latest bandwidth obtained by the node C is 5, and the latest bandwidth obtained by the node F is 50. Next, each of the nodes B, F, and C calculates an evaluation reference value and a route evaluation value, based on the obtained latest bandwidth. Here, since the route request packet has been received for the first time and the condition identification value of the route request packet is set at "1", the calculated evaluation reference value and route evaluation value are equal to the latest measurement value 203. Next, the node B adds "B and 100" as a relay apparatus address and the evaluation measurement value of the received route request packet, and updates the evaluation reference value to "100" (at the left of and below "reception 1"). Similarly, the node F adds "F and 50" as a relay apparatus address and the evaluation measurement value of the received route request packet, and updates the evaluation reference value to "50" (at the left of and below "reception 2"). The node C adds "C and 5" as a relay apparatus address and the evaluation measurement value of the received route request packet, and updates the evaluation reference value to "5" (at the left of and below "reception 3").

In addition, each of the nodes B, F, and C stores "A" and "120" as the source address 402 and the route request packet number 403, respectively, in the duplication management table 401. Moreover, each of the nodes B, F, and C determines a waiting time period that is a time period until the route request packet is transmitted, in accordance with the route evaluation value calculated as described above, and sets a timer for the waiting time period. Note that the higher the route evaluation value is, the shorter a waiting time period is set. Therefore, the waiting time periods set by the nodes, from shortest to longest, are the node B, the node F, and then the node C.

Hereinafter, processing performed when a node whose timer expires transmits the route request packet and other nodes receive the route request packet secondarily or later, will be described.

The node B, which is the node whose timer has expired first, broadcasts a stored route request packet (transmission 2). In the route request packet transmitted by the node B, the relay apparatus address and the evaluation measurement value are set at "B and 100", and the evaluation reference value is set at "100".

Although the node A receives the route request packet transmitted by the node B (reception 100), the node A discards the received route request packet since the source address included in the received route request packet is the address of the node A. This processing prevents a loop route from being generated, and prevents superfluous route request packets from being broadcasted. In addition, since the node A does not perform unnecessary determination such as comparison of route evaluation values, processing load is reduced.

Figure 8:
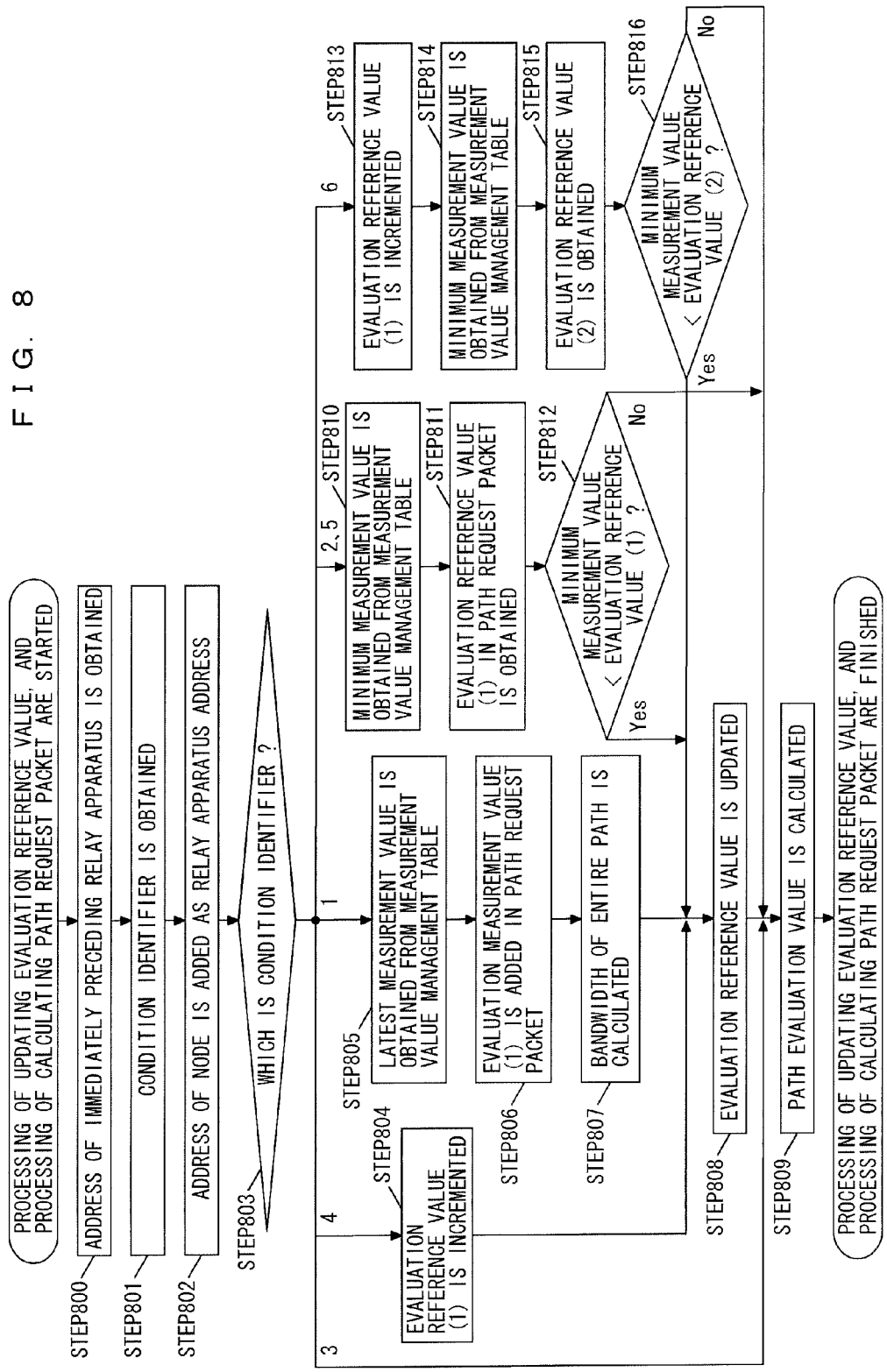
FIG. 8 is a flowchart showing evaluation reference value updating processing and route evaluation value calculation processing of the first embodiment.

On the other hand, each of the nodes F, C, and E also receives the route request packet transmitted by the node B (receptions 4, 5, and 6), and updates the received route request packet, based on the method shown in FIG. 8 since the address of each of the nodes F, C, and E is not included as a relay apparatus address in the received route request packet.

Since the node E has received the route request packet for the first time, the node E adds "E and 50" as a relay apparatus address and the evaluation measurement value of the received route request packet, and updates the evaluation reference value to "33" (at the left of and below "reception 6"), as in the aforementioned processing. Then, the node E sets a timer for a calculated waiting time period.

The node F obtains, from the measured value management table 201 in FIG. 2, the latest measurement value 203 (100) of the bandwidth corresponding to the same adjacent apparatus address 202 as the address (address B) of the node B, which is the immediately preceding relay apparatus. Moreover, the node F calculates the sum ($1/100+1/100=1/50$) of the multiplicative inverse of the obtained measurement value (100), and the multiplicative inverse of the bandwidth (100) between the nodes A and B, the bandwidth (100) being described as the evaluation measurement value 309. Then, the node F calculates the multiplicative inverse (50) of the sum as a new evaluation reference value. In addition, since the condition identification value of the received route request packet is set at "1", the node F also calculates, as "50", the route evaluation value. Then, the node F adds "F and 100" as a relay apparatus address and the evaluation measurement value of the received route request packet, and updates the evaluation reference value to "50" (at the left of and below "reception 4").

Next, since the route request packet number 304 (120) of the received route request packet is the same as the route request packet number 403 (120) in the duplication management table 401, the node F confirms that the route request packet has been duplicately received. In this case, the node F compares the route evaluation value (50) of the firstly received route request packet, which is stored, with the route evaluation value (50) of the secondly received route request packet. Since the request route number is set at "1", the node F needs to store the route request packet having the higher route evaluation value and to discard the route request packet having the lower route evaluation value. However, the route evaluation values of the two route request packets are equal to each other. Therefore, among these route request packets, the node F stores the route request packet that has taken the smaller number of hops. More specifically, the node F keeps stored the firstly received route request packet, and discards the secondly received route request packet (at the left of and below "reception 4"). Thus, when there are a plurality of routes having the same route evaluation value, a route having a smaller number of hops is selected, whereby the number of times a packet is relayed from the source node to the destination node upon communication can be reduced, and a delay time from when data is transmitted by the source node until the data arrives at the destination node can be reduced.

Similarly, the node C adds "C and 11" as a relay apparatus address and the evaluation measurement value of the received route request packet, and updates the evaluation reference value to "10" (at the left of and below "reception 5"). In the node C, the route evaluation value (10) of the secondly received route request packet is higher than the route evaluation value (5) of the firstly received route request packet, which is stored. Therefore, the node C stores the secondly received route request packet, the route request packet indicating "B and 100" and "C and 11" as the relay apparatus addresses and the evaluation measurement values, and "10" as the evaluation reference value (at the left of and below "reception 5").

Next, the node F, which is the node at which the timer has expired second, broadcasts (transmission 3) the stored route request packet that indicates "F and 50" as the relay apparatus address and the evaluation measurement value, and "50" as the evaluation reference value. When the node A receives the route request packet (reception 101), the node A discards the received route request packet since the received route request packet includes the address of the node A. When each of the nodes C and E receives the route request packet (reception 7 and reception 8), each of the nodes C and E updates the stored route request packet to the received route request packet.

Since the node B receives (reception 102) the route request packet after the timer expires, the node B discards the received route request packet. Thus, since each node discards a route request packet that is received after the timer expires, processing load on each apparatus is reduced. Moreover, the next relay apparatus does not need to perform processing for route request packets that have the same source address and the same destination address after the timer expires.

After such processing as described above is repeatedly performed, the node D, which is the destination apparatus, has stored, at the time when the timer expires, the secondly received route request packet, the route request packet indicating "F and 50", "E and 200", and "D and 200" as the relay apparatus addresses and the evaluation measurement values, and "33" as the route evaluation value (at the left of and below "reception 10"). The node D generates a return route request packet by replacing the destination address and the source address in the stored route request packet by each other and setting the request route number to "0", and transmits (transmission 6) the generated return route request packet to the source node by unicast via the route through which the stored route request packet has been relayed. Thus, the communication route is determined by returning, to the source node, the route request packet that has been finally determined by the destination node.

As described above, in the first embodiment, the timer 107 sets a timer for a predetermined waiting time period at a time when a route request packet is received for the first time, and the duplication detection section 104 determines whether or not route request packets have been duplicately received within the predetermined waiting time period. If route request packets have been duplicately received, the comparison section 105 selects route request packets having as high route evaluation values as possible, the number of the route request packets to be selected being equal to the request route number. Then, the transmission section 109 transmits the selected route request packets to the adjacent apparatus. Thus, consumption of bandwidth can be suppressed by reducing the number of route request packets to be transmitted for searching for a route, and a route having a high route evaluation value which indicates a state of the route can be created between the source apparatus and the destination apparatus.

In addition, the timer 107 sets the waiting time period in accordance with the route evaluation value calculated from a received route request packet. Thus, since timings of transmission of a route request packet can be dispersed among communication apparatuses, the possibility that route request packets transmitted by communication apparatuses collide with each other can be reduced, compared to the case where the waiting time is fixed.

Moreover, the lower the route evaluation value calculated from a firstly received route request packet is, the longer waiting time period the timer 107 sets. Thus, in the case where the route evaluation value of a route between a communication apparatus and the source apparatus is low, the possibility of the communication apparatus receiving a route request packet that has passed through a route having a high route evaluation value can be increased. Therefore, a communication apparatus can more certainly search for a route having a high route evaluation value.

In addition, a source apparatus can set the request route number of a route request packet, and a relay apparatus broadcasts route request packets the number of which is equal to the request route number. Thus, for example, in the case where states of routes frequently vary, the possibility that communication cannot be performed on all routes created by a source apparatus can be decreased by the source apparatus increasing routes to be created. On the other hand, in the case opposite to the above case, the source apparatus can decrease the routes to be created in order to restrict the number of route request packets to be broadcasted for creating a route. Therefore, stable communication can be ensured, and at the same time, consumption of bandwidth can be suppressed.

Note that the format of the route request packet may be extended as described below. Firstly, in the case where the evaluation reference value 307 corresponding to the condition identifier 306 can be calculated even without storing all states of communication measured between the respective pairs of relay apparatuses and immediately preceding relay apparatuses on the route, the route request packet 301 may not include the evaluation measurement value 309. Thus, since the packet length of the route request packet becomes short, the bandwidth consumed by transmitting the route request packet can be reduced. For example, if the condition identifier is set at "2" or "5", the evaluation reference value 307 is the minimum value on an entire route, among certain values relating to a particular state of communication, and each relay apparatus only needs to updates the evaluation reference value 307 to the lower one of the minimum value and a measurement value measured by the relay apparatus. Therefore, each relay apparatus does not need to add, as the evaluation measurement value 309, the state of communication between each pair of relay apparatuses. If the condition identifier is set at "3", a relay apparatus does not need to update the evaluation reference value 307 after the source apparatus sets the value of the evaluation reference value 307. Thus, the evaluation measurement value 309 is not necessary. If the condition identifier is set at "4", each relay apparatus only needs to add "1" to the evaluation reference value 307 after the source apparatus sets the evaluation reference value 307 at "0". Thus, the evaluation measurement value 309 is not necessary. In addition, if the condition identifier is set at "6", the evaluation reference value 307, which is needed when the condition identifier is set at "2" or "5", only needs to be calculated. Thus, the evaluation measurement value 309 is not necessary. Therefore, among "1" to "6", only in the case where the condition identifier is set at "1", the route request packet 301 certainly includes the evaluation measurement value 309, and the evaluation measurement value 309 is the latest bandwidth of communication measured between each relay apparatus and the immediately preceding relay apparatus.

However, even if the condition identifier 306 is set at "2" to "6", the route request packet 301 may additionally include the evaluation measurement value 309. Alternatively, the route request packet 301 may not include the evaluation reference value 307 as long as the route request packet 301 includes a particular state of communication between each pair of relay apparatuses as the evaluation measurement value 309. In this case, each relay apparatus calculates the evaluation reference value 307, based on the evaluation measurement value 309.

In addition, if the condition identifier 306 is set at "2" and "6", the route request packet 301 may include, as the evaluation measurement value 309, the latest measurement value 203 instead of the minimum measurement value 206. Thus, when a plurality of route request packets having the route evaluation values equal to each other are received, the latest bandwidth on an entire route can be calculated and used as another reference for selection.

Moreover, the condition identifier 306 is not limited to the six types described above. For example, in the case of using the condition identifier "1" or "2", the average of the bandwidth calculated based on a history of a past state of communication may be used. In the case of using the condition identifier "3", the sum of the average values or the maximum values of the delay times calculated between respective pairs of relay apparatuses on the route through which the route request packet has passed may be used as the evaluation reference value, the delay times being measured during the past certain time period at regular time intervals by the measurement section 102 reciprocally transmitting a Hello packet with a transmission time to the adjacent apparatus. In the case of using the condition identifier "5", the average value or the maximum value of a duration time of communication may be used based on a history of the past state of communication.

Moreover, a source apparatus may search for an optimum route by using a combination of a plurality of conditions. In this case, the source apparatus sets, as the condition identifier 306, identifiers indicating a plurality of conditions, and sets, as the evaluation reference value 307, values indicating the states of a plurality of routes corresponding to the plurality of conditions. However, in the setting, it is necessary to satisfy two requirements that each communication apparatus can discriminate the priority order of a plurality of conditions, and that each communication apparatus can determine which condition identifier each evaluation reference value set as the evaluation reference value 307 corresponds to. In order to satisfy the two requirements, for example, the condition identifiers may be set as the condition identifier 306 in descending order starting from a condition identifier corresponding to a condition having the highest priority among the plurality of conditions, and the evaluation reference values may be set as the evaluation reference value 307 in descending order from a evaluation reference value corresponding to a condition having the highest priority among the plurality of conditions. In this method of setting, if a source apparatus searches for, among all routes, a route having the largest bandwidth based on the latest state of communication, and having the fewest hops if there are a plurality of routes having the same and largest bandwidth, "1" and "4" are set as the condition identifier 306 in this order. In addition, two areas of evaluation reference value (1) and evaluation reference value (2) are secured as the evaluation reference value 307. The bandwidth of communication on a route from a source apparatus to a communication apparatus, which is estimated based on the latest state of communication between each pair of relay apparatuses on the route, is stored as the evaluation reference value (1), and the number of hops on the route are stored as the evaluation reference value (2). Further, the evaluation measurement value (1) corresponding to the evaluation reference value (1) is secured as the evaluation measurement value 309, and the latest bandwidth of communication measured between each relay apparatus and the corresponding immediately preceding relay apparatus is stored as the evaluation measurement value (1).

Moreover, in the first embodiment, if the request route number of the route request packet is larger than "1", the transmission section 109 may collectively write the contents of a plurality of route request packets in a route request packet, and transmit the route request packet.

Second Embodiment

In the first embodiment described above, a waiting time period is set based on a route request packet that has been received for the first time by each apparatus, and the waiting time period is not updated once the setting is performed. However, the waiting time period set based on the route request packet that has been received for the first time cannot be always appropriate. For example, if the set waiting time period is excessively long, it takes a long time for a relay apparatus to transmit the route request packet, and thus it takes a long time until a route is set. As a result, the start of communication of data is delayed. On the other hand, if the set waiting time period is excessively short, even when a communication apparatus receives a route request packet having a higher route evaluation value after the waiting time period elapses, the communication apparatus has a high possibility to discard the route request packet.

Accordingly, in the second embodiment, in order to set a route having a high route evaluation value as early as possible, a communication apparatus reduces the waiting time period that has been set for the first time, when the route evaluation value of a received route request packet satisfies a certain condition. Alternatively, the communication apparatus transmits the route request packet before the timer expires. Such examples will be described below.

Figure 11:
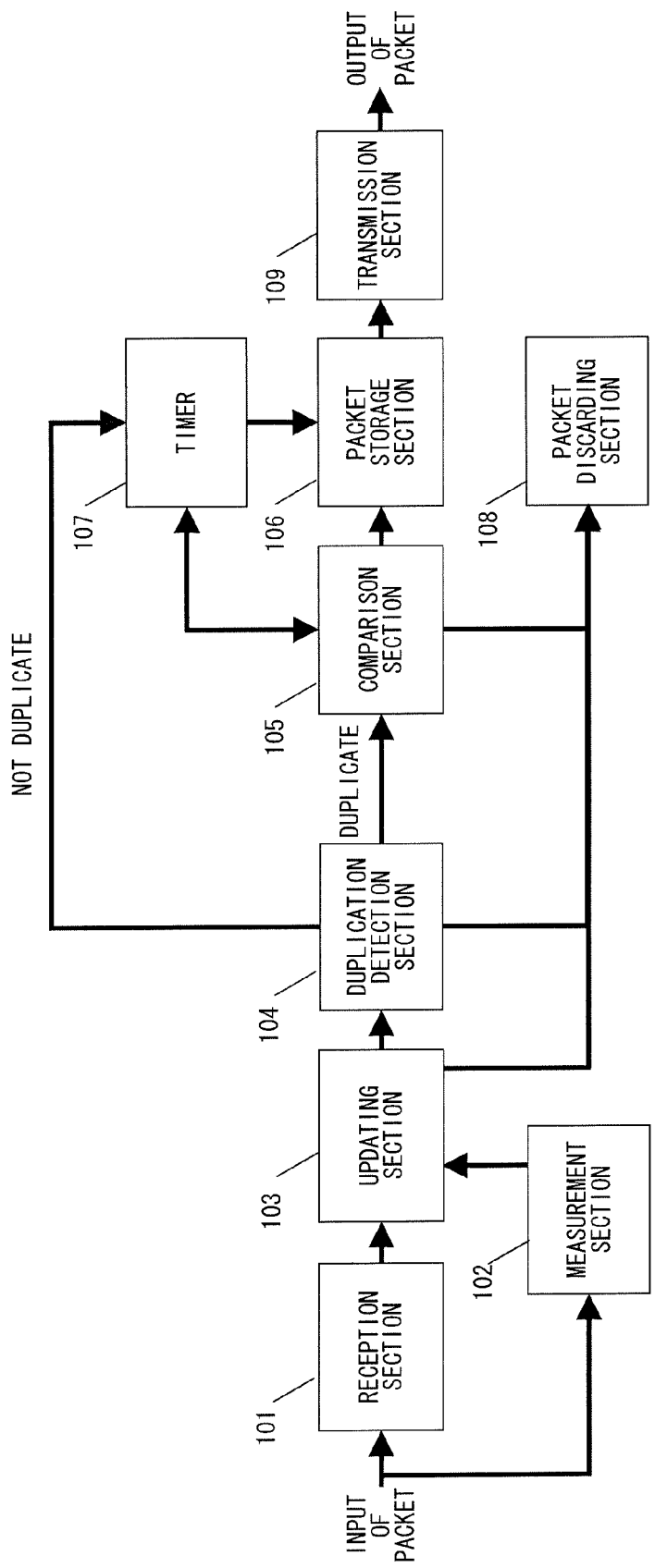
FIG. 11 is a function block diagram of a communication apparatus of a second embodiment.

FIG. 11 is a function block diagram of a communication apparatus according to the second embodiment of the present invention. Although the number and the type of components of the communication apparatus in FIG. 11 are the same as those in FIG. 1, the comparison section 105 and the timer 107 of the present embodiment are directly connected to each other in order that the comparison section 105 updates the timer 107 or refers to the value of the timer 107.

Next, operation of each component of the present embodiment will be described. Among the components of the present embodiment shown in FIG. 11, only operation of the comparison section 105 is different from that of the first embodiment. In addition to performing operation of the first embodiment, the comparison section 105 compares the waiting time period, the route evaluation value, and the number of hops for a newly received route request packet, respectively with those for the previously received route request packet, and then shortens or extends the waiting time period of the timer 107, based on a predetermined condition. In addition, when the comparison section 105 receives route request packets having the same source apparatus and the same destination apparatus and when the number of the received request packets has reached a predetermined threshold value, the comparison section 105 causes the waiting time period for the timer 107 to expire.

In addition, the route request packet 301 of the present embodiment further includes an evaluation reference value (0) as the evaluation reference value 307, and the evaluation reference value (0) is an area in which the number of hops is written. Moreover, the route request packet 301 may include a flag indicating that a expiry time of a timer has been delayed. In this case, when a communication apparatus detects that the flag in a route request packet is ON, which indicates that a expiry time of a timer has been delayed, the timer 107 of the communication apparatus sets a new timer in order that the communication apparatus receives another route request packet having a high route evaluation value, which is to be transmitted later by a communication apparatus that has transmitted the former route request packet.

Figure 12:
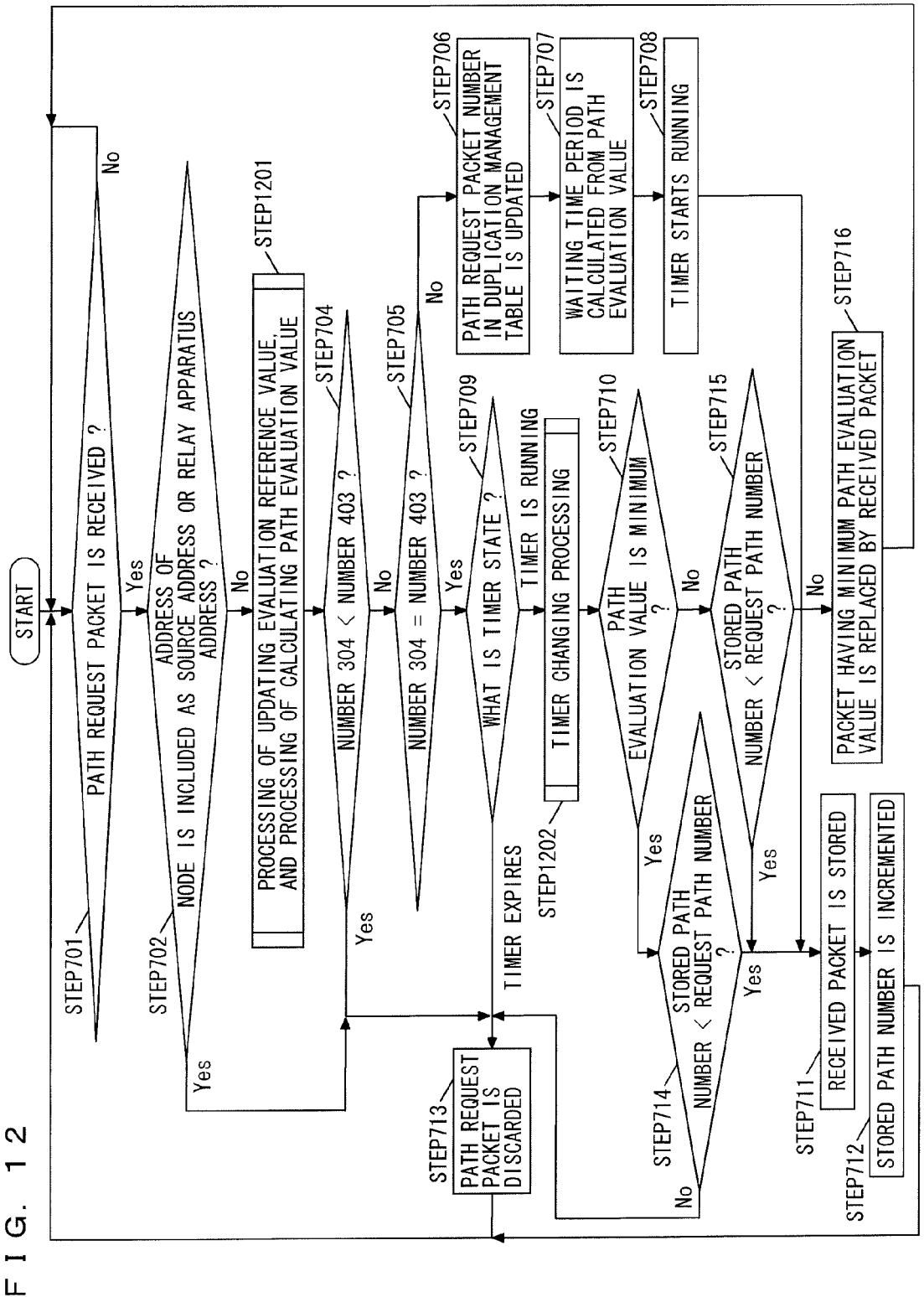
FIG. 12 is a flowchart showing route request packet reception processing performed by the communication apparatus of the second embodiment.
Figure 13:
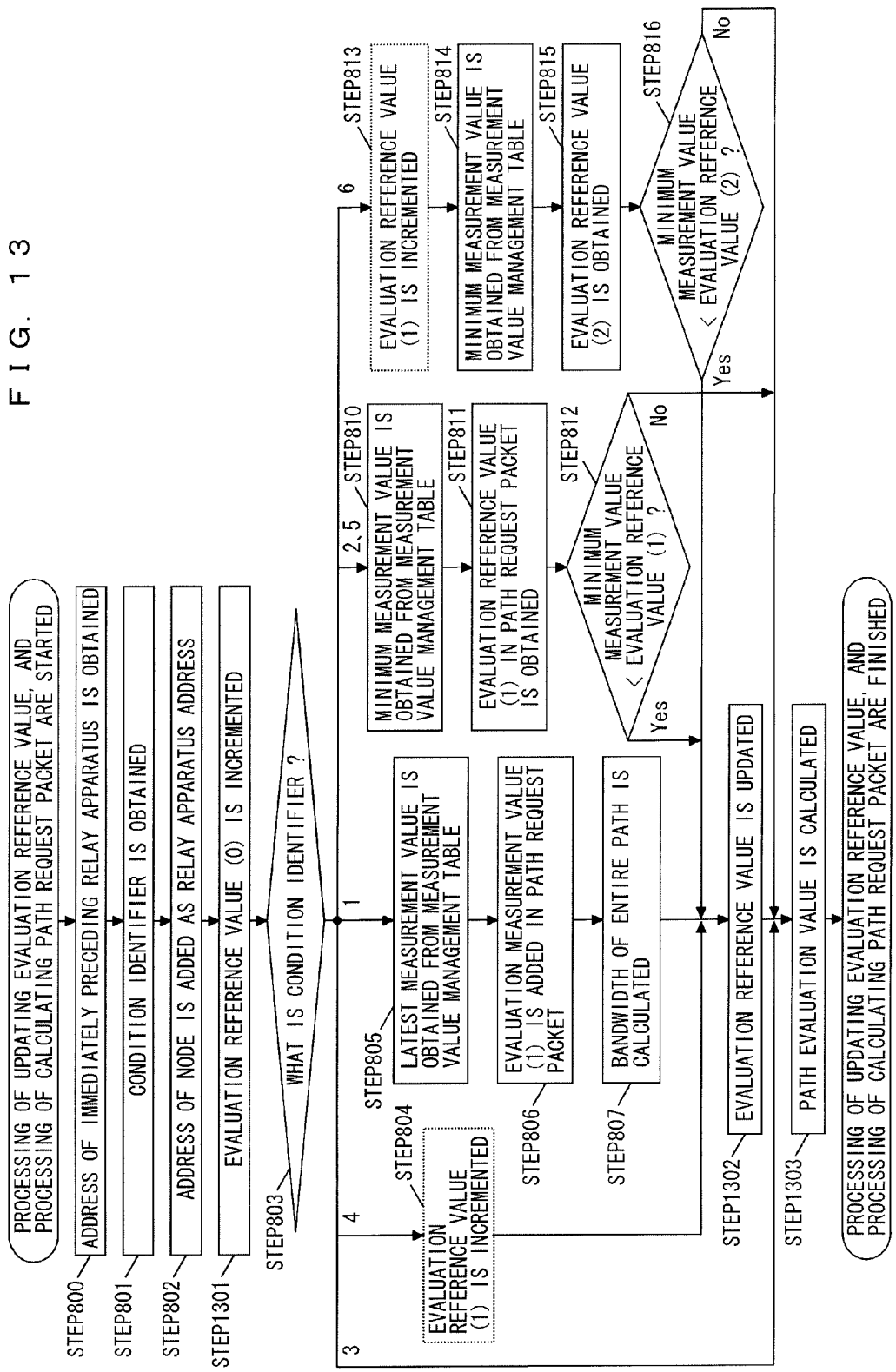
FIG. 13 is a flowchart showing evaluation reference value updating processing and route evaluation value calculation processing of the second embodiment.
Figure 14:
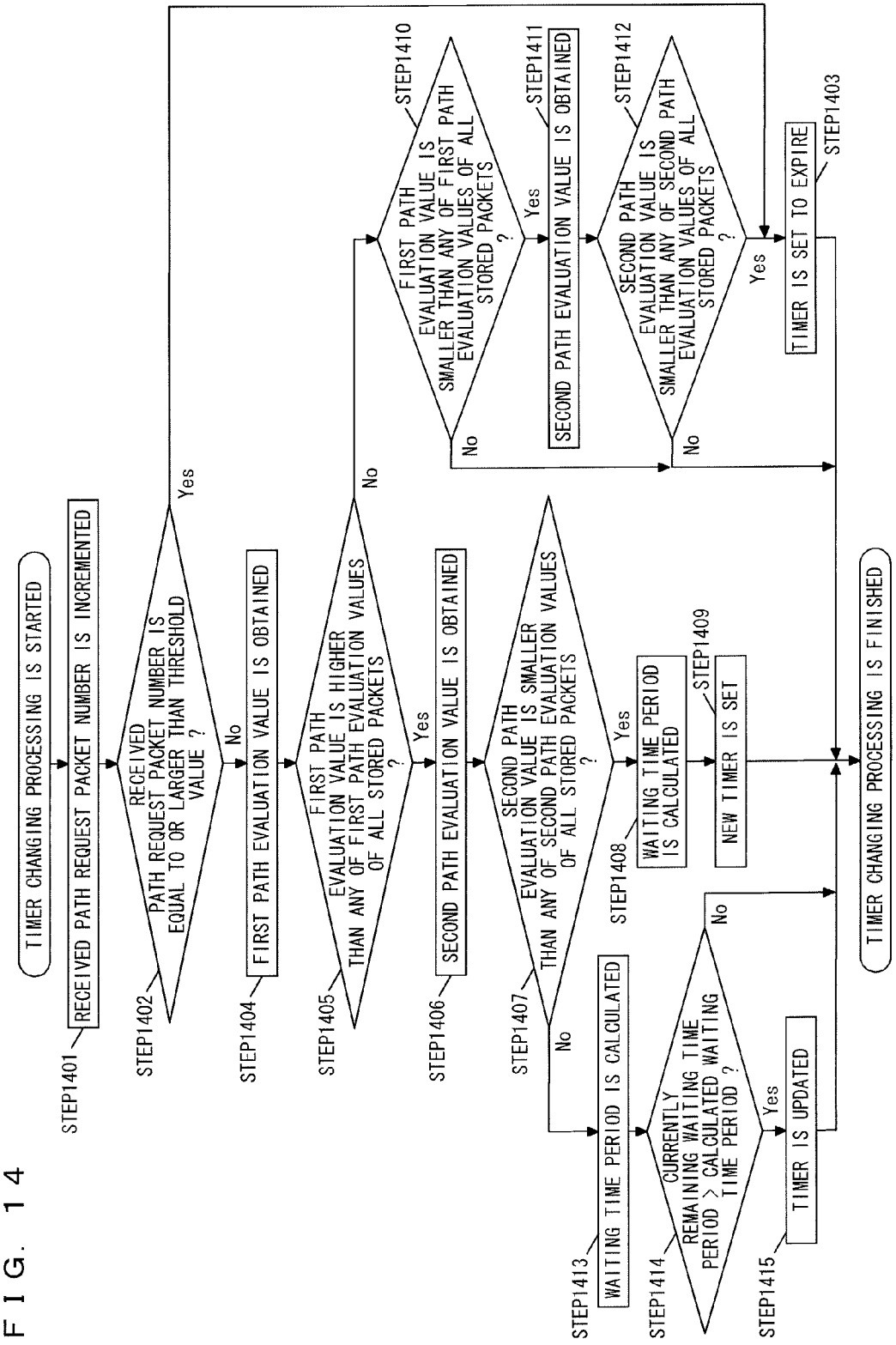
FIG. 14 is a flowchart showing timer changing processing performed by the communication apparatus of the second embodiment.

Operation of the communication apparatus having the above configuration will be described with reference to FIG. 12 to FIG. 14. FIG. 12 is a flowchart showing processing of receiving a route request packet, which is executed by each communication apparatus of the present embodiment. Note that in FIG. 12, the same steps of processing of reception as those shown in FIG. 7 in the first embodiment are denoted by the same reference numerals. Here, the difference between FIG. 12 and FIG. 7 will be described.

Processing in STEP 1201 corresponds to processing in STEP 703 in FIG. 7. After the reception section 101 receives a route request packet, the updating section 103 performs processing of updating the evaluation reference value, and processing of calculating the route evaluation value (STEP 1201). FIG. 13 is a flowchart showing processing in STEP 1201. Note that in FIG. 13, the same steps of processing as those of the processing, shown in FIG. 8, of updating an evaluation reference value and calculating a route evaluation value in the first embodiment are denoted by the same reference numerals. Here, the difference between FIG. 13 and FIG. 8 will be described.

Before the flow of processing is branched in accordance with the condition identifier in STEP 803, the updating section 103 increments the evaluation reference value (0) (STEP 1301). This is because, in the second embodiment, the number of hops is used, regardless of the condition identifier, for searching for a route. Next, upon updating an evaluation reference value, the updating section 103 updates the evaluation reference value (0), together with the other evaluation reference value (STEP 1302). Finally, the updating section 103 calculates, as a second route evaluation value, a route evaluation value corresponding to the evaluation reference value (0), together with the other route evaluation value (STEP 1303). Since the second route evaluation value is calculated based on the number of hops the updating section 103 calculates, as the second route evaluation value, a value that increases if the number of hops decreases, for example, the multiplicative inverse of the number of hops, or a value obtained by normalizing the multiplicative inverse. Hereinafter, a route evaluation value other than the second route evaluation value is referred to as a first route evaluation value. Note that the first route evaluation value is the same as the route evaluation value of the first embodiment.

Note that in the present embodiment, since the number of hops is stored as the evaluation reference value (0) of the route request packet, if the condition identifier is set at "4" or "6", the evaluation reference value (0) may be used instead of the evaluation reference value (1). Therefore, processing in STEP 804 or STEP 813, which are shown by a dotted line in FIG. 13, may be omitted, and the evaluation reference value (0) may be used in processing after STEP 804 or STEP 813.

After the updating section 103 finishes the above-described processing of updating an evaluation reference value and processing of calculating a route evaluation value (STEP 1201 in FIG. 12), if the duplication detection section 104 determines that the duplicately received route request packet has been received before the timer expires ("timer is running" in STEP 709), the comparison section 105 performs processing of changing a timer (STEP 1202). FIG. 14 is a flowchart showing the timer changing processing executed by the comparison section 105.

First, the comparison section 105 increments a received route request packet number which indicates how many route request packets having the same source address and the same reception route request packet number have been received (STEP 1401). In this case, in order to store the received route request packet number, it is desirable that the received route request packet number is added to the components of the duplication management table 401.

Next, the comparison section 105 determines whether or not the received route request packet number is equal to or larger than a threshold value (STEP 1402). The predetermined threshold value is the number, of route request packets to be received, which is sufficient to create a route having a high route evaluation value. Typically, the threshold value is stored in each communication apparatus. Note that the source apparatus may store the threshold value in the route request packet 301. Alternatively, information about how many times the threshold value is as large as the request route number 305 may be set in each communication apparatus, and each communication apparatus may calculate the threshold value in accordance with the request route number 305 set by the source apparatus. Still alternatively, a communication apparatus may constantly measure a route request packet relayed by the communication apparatus, and the communication apparatus may set, by learning, an optimum threshold value for the route request packet number. If the comparison section 105 determines that the received route request packet number is equal to or larger than the threshold value (Yes in STEP 1402), the comparison section 105 causes the previously set timer to expire (STEP 1403), and finishes the timer changing processing.

On the other hand, if the received route request packet number is smaller than the threshold value (No in STEP 1402), the comparison section 105 obtains the first route evaluation value of the received route request packet (STEP 1404). Next, the comparison section 105 determines whether or not the obtained first route evaluation value is higher than any of the first route evaluation values of all route request packets stored in the packet storage section 106 (STEP 1405).

If the comparison section 105 determines that the obtained first route evaluation value is higher than any of the first route evaluation values (Yes in STEP 1405), the comparison section 105 obtains the second route evaluation value of the received route request packet (STEP 1406). Next, the comparison section 105 determines whether or not the obtained second route evaluation value is lower than any of the second route evaluation values of all route request packets stored in the packet storage section 106 (STEP 1407).

If the comparison section 105 determines that the obtained second route evaluation value is lower than any of the second route evaluation values (Yes in STEP 1407), the comparison section 105 calculates a waiting time period, based on the obtained first route evaluation value (STEP 1408). Next, the comparison section 105 sets a new timer, based on the calculated waiting time period (STEP 1409), and finishes the timer changing processing.

If the comparison section 105 determines that the obtained second route evaluation value is equal to or higher than one of the second route evaluation values of route request packets stored in the packet storage section 106 (No in STEP 1407), the comparison section 105 calculates a waiting time period, based on the obtained first route evaluation value (STEP 1413). Next, the comparison section 105 compares the calculated waiting time period with a remaining time of the currently set timer (STEP 1414). If the calculated waiting time period is shorter than a remaining time of the currently set timer, the comparison section 105 updates the remaining time of the currently set timer to the calculated waiting time period (STEP 1415), and finishes the timer changing processing. On the other hand, if the calculated waiting time period is equal to or larger than a remaining time of the currently set timer (No in STEP 1414), the comparison section 105 finishes the timer changing processing.

If the comparison section 105 determines that the obtained first route evaluation value is equal to or lower than one of the first route evaluation values of route request packets stored in the packet storage section 106 (No in STEP 1405), the comparison section 105 determines whether or not the obtained first route evaluation value is lower than any of the first route evaluation values of all route request packets stored in the packet storage section 106 (STEP 1410). If the comparison section 105 determines that the obtained first route evaluation value is equal to one of the first route evaluation values of route request packets stored in the packet storage section 106 (No in STEP 1410), the comparison section 105 finishes the timer changing processing.

If the comparison section 105 determines that the obtained first route evaluation value is lower than any of the first route evaluation values (Yes in STEP 1410), the comparison section 105 obtains the second route evaluation value of the received route request packet (STEP 1411). Next, the comparison section 105 determines whether or not the obtained second route evaluation value is lower than any of the second route evaluation values of all route request packets stored in the packet storage section 106 (STEP 1412). If the comparison section 105 determines that the obtained second route evaluation value is lower than any of the second route evaluation values (Yes in STEP 1412), the comparison section 105 causes the timer to expire (STEP 1403), and finishes the timer changing processing. On the other hand, if the comparison section 105 determines that the obtained second route evaluation value is equal to or higher than one of the second route evaluation values of route request packets stored in the packet storage section 106 (No in STEP 1412), the comparison section 105 finishes the timer changing processing.

Figure 15:
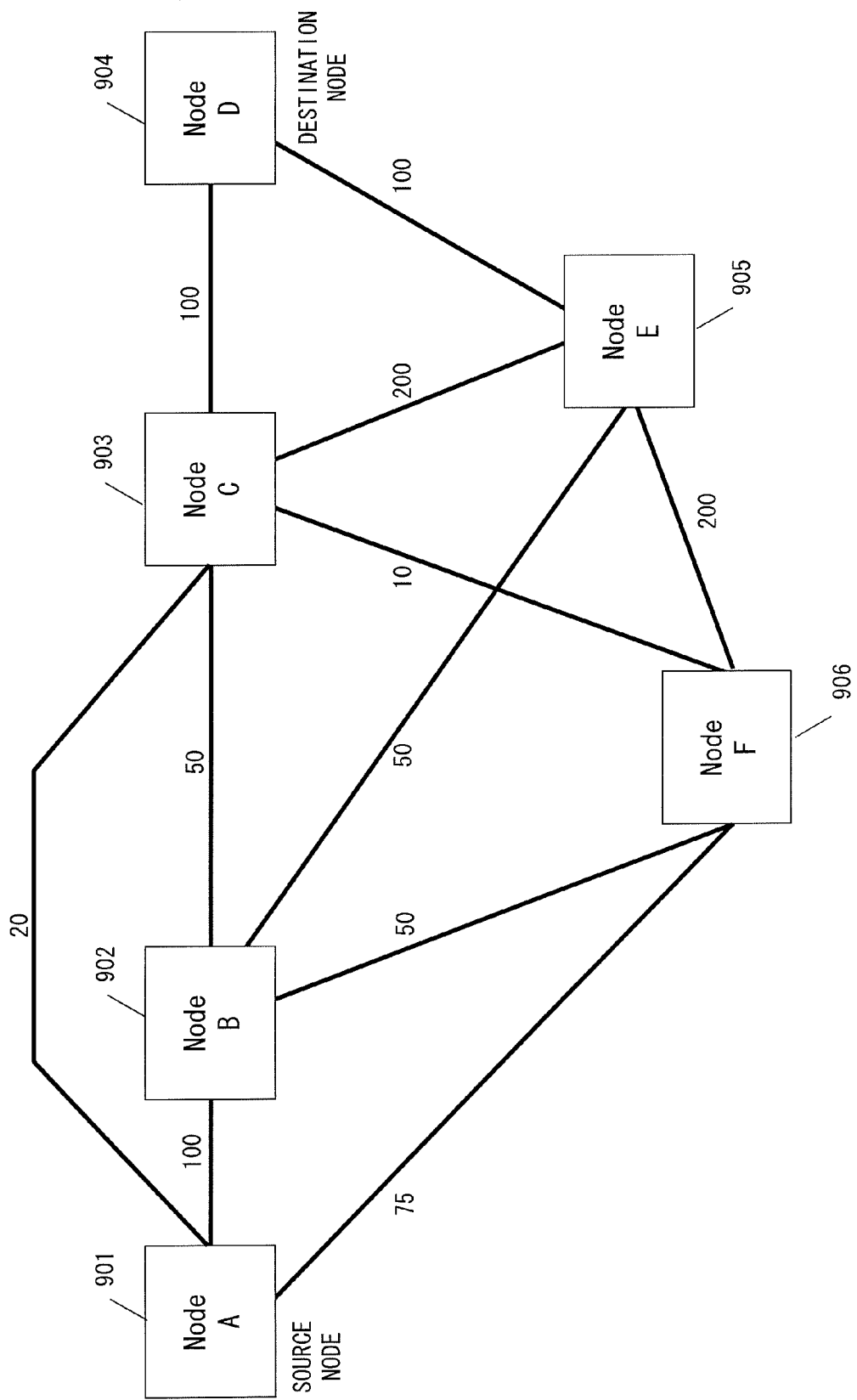
FIG. 15 is a network configuration diagram in the second embodiment.

Next, a specific example of the application of the invention of the second embodiment will be described with use of FIGS. 15 and 16. FIG. 15 is a diagram showing a configuration of a network in the present embodiment. In FIG. 15, apparatuses that can directly communicate with each other are connected by solid lines, as in FIG. 9. In addition, a numerical value written for each solid line indicates the latest bandwidth expected in communication between a pair of apparatuses connected by the solid line. For convenience of description, the communication apparatuses 901 to 906 are respectively referred to as nodes A to F, the order of the numerals corresponding to the order of the alphabets. Moreover, the addresses of the communication apparatus 901 to 906 are respectively A to F, the order of the numerals corresponding to the order of the alphabets. Also in the present embodiment, an example in which: the node A (source node) designates a condition in accordance with the type of data to be communicated between the node A and the node D (destination node) which cannot directly communicate with the node A; and then searches for a route, will be described.

Figure 16:
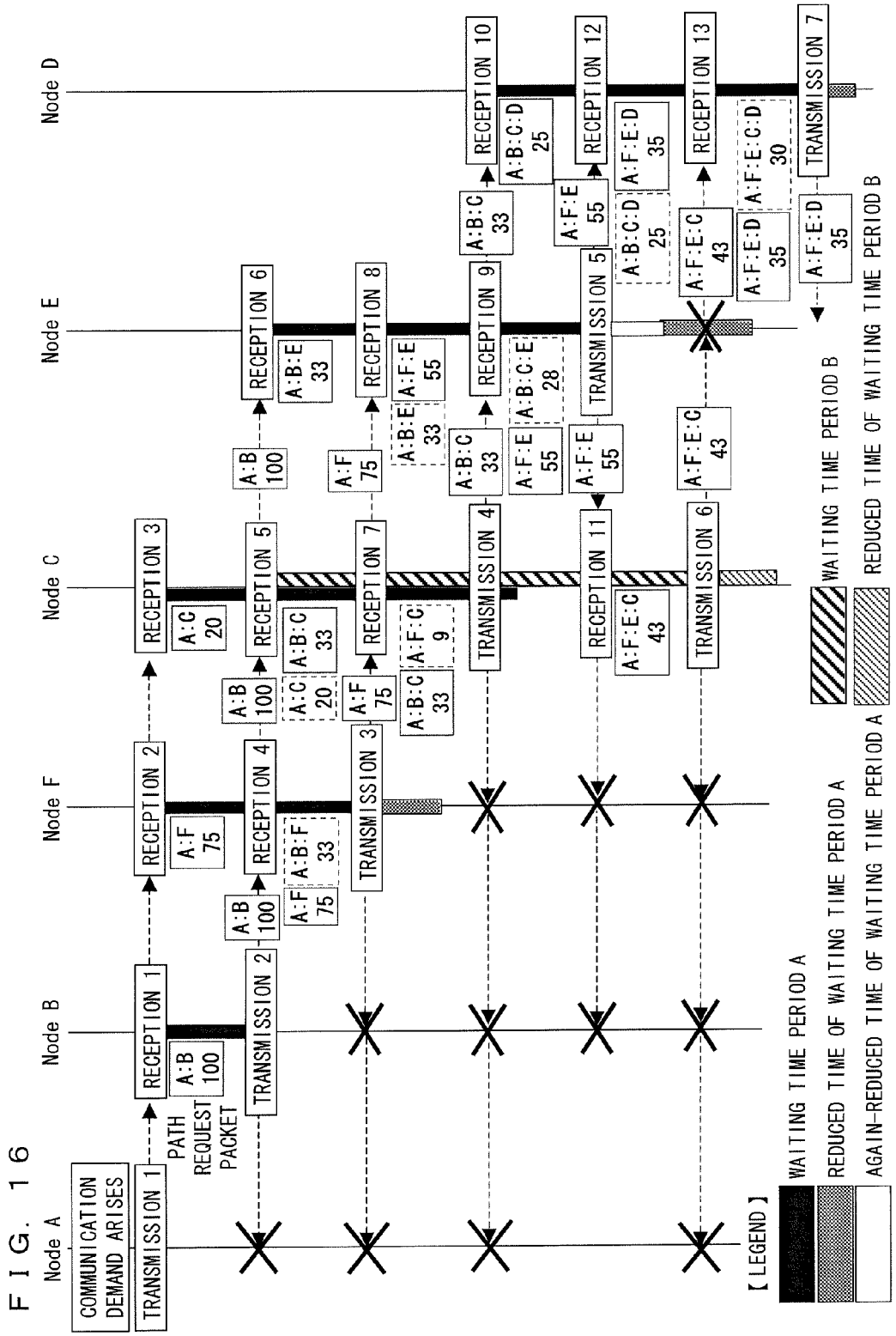
FIG. 16 is a sequence diagram showing the case where, in the second embodiment, data communication from the communication apparatus 901 to the communication apparatus 904 is requested.

FIG. 16 is a sequence diagram showing the case where, in the present embodiment, demand for starting data communication from the node A to the node D arises and the node A searches for a route to the node D. Among the signs shown in FIG. 16, those written in the same manner as in FIG. 10 indicate the same contents as those shown in FIG. 10. In FIG. 16, the contents written as a legend are different from those written in FIG. 10. First, a waiting time period A indicates a waiting time period set based on the route evaluation value of the firstly received route request packet. A reduced time of the waiting time period A indicates the length of time by which the waiting time period A is reduced through processing in STEP 1403 or STEP 1415 in FIG. 14. An again-reduced time of the waiting time period A indicates the length of time by which the waiting time period that has been once reduced from the waiting time period A is further reduced through the processing in STEP 1403 or STEP 1415 in FIG. 14 being performed again. Next, a waiting time period B indicates a waiting time period for a timer that is newly set through processing in STEP 1409 in FIG. 14. A reduced time of the waiting time period B indicates the length of time by which the waiting time period B is reduced through processing in STEP 1403 or STEP 1415 in FIG. 14 being performed after the timer for the waiting time period B is set.

In the present embodiment, the threshold value (threshold value used in STEP 1402 in FIG. 14) for the number of route request packets to be received during a waiting time period is set at "4". When each relay apparatus receives a route request packet for the fourth time, the relay apparatus transmits route request packets stored at this point of time, even if the timer has not expired.

The node A creates a route request packet when demand for starting data communication arises. In the present embodiment, the route request packet 301 transmitted by the node A is set such that the route request packet number 304 is "120", the request route number 305 is "1", and the condition identifier 306 is "1". In addition, the evaluation reference value (0) of the evaluation reference value 307 is set at "0" as an initial value. The evaluation reference value (1) is an area in which a route evaluation value calculated based on the condition identifier by each relay apparatus is written, and the evaluation reference value (1) is set at "0" as an initial value.

When the node A transmits the route request packet (transmission 1), each of the nodes B, F, and C receives the route request packet (reception 1, reception 2, and reception 3). Each of the nodes B, F, and C increments the evaluation reference value (0) included in the received route request packet, whereby the evaluation reference value (0) is updated to "1". Next, when each node determines that the condition identifier of the received route request packet is set at "1", the node adds the address of the node as a relay node address in the received route request packet, and adds, as the corresponding evaluation measurement value (1), the latest bandwidth of communication between the node and the node A, the bandwidth being obtained from the measured value management table 201. Moreover, each node updates the evaluation reference value (1) included in the route request packet, to the bandwidth of communication between the node and the node A, the bandwidth being obtained from the measured value management table 201. Thereafter, each node calculates a waiting time period, based on the evaluation reference value (1), and sets a timer. In this case, the timer of each of the nodes B, F, and C is set such that the waiting time periods of the nodes expire in the order of the node B, the node F, and the node C. Note that in FIG. 16, the sum of the waiting time period A and the reduced time of the waiting time period A is a waiting time period set at this point of time.

Hereinafter, processing performed when a node at which the timer has expired transmits the route request packet and other nodes receive the route request packet secondarily or later, will be described.

The node B, which is the node at which the waiting time period has expired first, broadcasts (transmission 2) the stored route request packet in which: the relay apparatus address and the evaluation measurement value are set at "B and 100"; the evaluation reference value (0) is set at "1"; and the evaluation reference value (1) is set at "100".

Each of the nodes F, C, and E receives the route request packet (reception 4, reception 5, and reception 6). Then, each node increments the evaluation reference value (0) included in the received route request packet, whereby the evaluation reference value (0) is updated to "2". Next, when each node determines that the condition identifier of the received route request packet is set at "1", the node adds the address of the node as a relay node address in the received route request packet, and adds, as the corresponding evaluation measurement value (1), the latest bandwidth of communication between the node and the node B, the latest bandwidth being obtained from the measured value management table 201. Each of the nodes F, C, and E calculates the bandwidth of communication on the corresponding route, based on the values stored as the evaluation measurement value (1), and updates the evaluation reference value (1) to the calculated bandwidth.

As a result, the node F updates the evaluation reference value (0) to "2", the evaluation reference value (1) to "33", and the relay apparatus address and the corresponding evaluation measurement value (1) to "B and 100" and "F and 50", which are included in the received route request packet (at the left of and below "reception 4"). Here, the route request packet that has been received for the second time by the node F satisfies the condition that the evaluation reference value (1) is lower, that is, the first route evaluation value is lower. Moreover, the route request packet satisfies the condition that the route request packet has taken more hops than the route request packet that has been received for the first time by the node F, that is the second route evaluation value is also lower. In this case, although the timer at the node F has not expired, the node F updates the timer state 404 of the duplication management table 401 to "Expiry", and at this timing, transmits the stored route request packet which has been received for the first time (transmission 3). Note that in FIG. 16, the reduced time of the waiting time period A indicates the waiting time period by which the waiting time period A is reduced at this time.

After the node C receives (reception 5) the route request packet transmitted by the node B, the node C updates the evaluation reference value (0) to "2", the evaluation reference value (1) to "33", and the relay apparatus address 308 and the evaluation measurement value (1) to "B and 100" and "C and 50", which are included in the received route request packet (at the left of and below "reception 5"). Here, the secondly received route request packet satisfies the condition that the evaluation reference value (1) is higher, that is, the first route evaluation value is higher. Moreover, the route request packet satisfies the condition that the route request packet has taken more hops than the stored route request packet that has been received for the first time by the node C, that is, the second route evaluation value is lower. In this case, the node C also calculates a waiting time period based on the secondly received route request packet, and sets a second timer for the calculated waiting time period. In this case, since the expiry time of the second timer is later than the expiry time of the first timer, the whole waiting time period is increased. Note that in FIG. 16, the sum of the waiting time period B and the reduced time of the waiting time period B indicates the waiting time period set by the second timer.

Note that the node C once transmits (transmission 4) the stored route request packets at the time when the first timer expires, and transmits (transmission 6), at the time when the second timer expires, the route request packets that has been received and stored after the first timer expires. In this case, the node C does not update the timer state 404 of the duplication management table 401 at the time when the first timer expires, the timer state 404 remaining "Running", and updates the timer state 404 to "Expiry" at the time when the second timer expires.

Thereafter, the node C receives (reception 7) the route request packet transmitted (transmission 3) by the node F, and updates the evaluation reference value (0) and the evaluation reference value (1) of the received route request packet to "2" and "9", respectively (at the left of and below "reception 7"). The node C discards the received route request packet since the evaluation reference value (1) of the received route request packet is lower than the evaluation reference value (1) of the secondly received route request packet.

When the node E receives (reception 6) the route request packet transmitted (transmission 2) by the node B, the node E updates and stores the received route request packet, and sets a timer, since the received route request packet is a route request packet which has been received for the first time. Note that in FIG. 16, the sum of the waiting time period A, the reduced time of the waiting time period A, and the again-reduced time of the waiting time period A is a waiting time period set at this point of time.

Thereafter, the node E receives (reception 8) the route request packet transmitted (transmission 3) by the node F, and updates the evaluation reference value (0) and the evaluation reference value (1) of the received route request packet to "2" and "55", respectively (at the left of and below "reception 8"). The node E also calculates a waiting time period based on the route request packet received at this time, since the first evaluation reference value of the route request packet received at this time is higher than the first evaluation reference value of the firstly received route request. Since the expiry time of a timer based on the waiting time period calculated at this time is earlier than that of the timer that has been previously set, the node E updates the timer that has been previously set, such that the timer will expire at the expiry time of a timer based on the waiting time period calculated at this time. Note that in FIG. 16, the reduced time of the waiting time period A indicates the waiting time period by which the waiting time period A is reduced at this time.

Thereafter, the node E receives (reception 9) the route request packet that has been transmitted (transmission 4) for the first time by the node C. Then, the node E updates the evaluation reference value (0) and the evaluation reference value (1) of the received route request packet to "3" and "28", respectively (at the left of and below "reception 9"). Since the route request packet received at this time by the node E has a lower evaluation reference value (1) and has taken a larger number of hops than the route request packet that has been received for the second time by the node E, both the first and the second route evaluation values of the route request packet received at this time by the node E are lower than those of the route request packet that has been received for the second time by the node E. Therefore, the node E doesn't wait for the expiry of the timer set by once reducing the waiting time period, and the node E transmits (transmission 5) the route request packet in which the evaluation reference value (0) is set at "2", the evaluation reference value (1) is set at "55", and the relay apparatus addresses and the evaluation measurement values (1) are set at "F and 75" and "E and 200". Note that in FIG. 16, the again-reduced time of the waiting time period A indicates the waiting time period by which the waiting time period is reduced at this time.

When the node D receives (reception 10) the route request packet that has been transmitted (transmission 4) for the first time by the node C, since the received route request packet is a route request packet which has been received for the first time by the node D, the node D updates and stores the received route request packet, and sets a timer. Note that in FIG. 16, the sum of the waiting time period A and the reduced time of the waiting time period A is the waiting time set at this point of time. Next, the node D receives (reception 12) the route request packet transmitted (transmission 5) by the node E, the node D updates the evaluation reference value (0) and the evaluation reference value (1) of the received route request packet to "3" and "35", respectively (at the left of and below "reception 12"). Since the evaluation reference value (1) of the secondly received route request packet is higher than that of the firstly received route request packet, the first route evaluation value of the secondly received route request packet is higher than that of the firstly received route request packet. Therefore, the node D also calculates a waiting time period based on the secondly received route request packet. However, since the expiry time of a timer based on the waiting time period that has been later calculated is later than the expiry time of the timer that has been previously set, the node D does not update the timer, and updates the stored route request packet to the later received route request packet.

In addition, when the node C receives (reception 11) the route request packet transmitted (transmission 5) by the node E, the node C updates the evaluation reference value (0) and the evaluation reference value (1) of the received route request packet to "3" and "43", respectively, and stores the received route request packet (at the left of and below "reception 11"). Since the received route request packet is a route request packet which has been received for the fourth time by the node C, the node C transmits (transmission 6) stored route request packets before the second timer expires, and updates the timer state 404 of the duplication management table 401 to "Expiry". Note that in FIG. 16, the reduced time of the waiting time period B indicates the waiting time period by which the waiting time period set for the second timer is reduced at this time.

When the node C transmits (transmission 6) the route request packet for the second time, the node D receives (reception 13) the route request packet, and updates the evaluation reference value (0) and the evaluation reference value (1) of the received route request packet to "4" and "30", respectively (at the left of and below "reception 13"). Since the route request packet received at this time by the node D has a lower evaluation reference value (1) and has taken more hops than the route request packet that has been received for the second time by the node D, both the first and the second route evaluation values of the route request packet received at this time by the node D are lower than those of the route request packet that has been received for the second time by the node D. Therefore, the node D doesn't wait for the expiry, of the timer set for the first time, and the node D generates a route request packet by replacing the destination address and the source address of the stored route request packet by each other, and setting the request route number of the stored route request packet to "0", and transmits (transmission 7), by unicast, the generated route request packet via the route through which the original route request packet has been relayed. Note that in FIG. 16, the reduced time of the waiting time period A indicates the waiting time period by which the waiting time period A is reduced at this time.

As described above, in the second embodiment, if the expiry time of the waiting time period set based on a later received route request packet is earlier than the expiry time of the waiting time period set based on a earlier received route request, the communication apparatus reduces the waiting time period of the timer. Thus, after a long waiting time period is set since a route evaluation value calculated from the earlier received route request packet is low, even if the communication apparatus receives a route request packet having a high route evaluation value, the communication apparatus can soon transmit the route request packet having the high route evaluation value. Therefore, the next apparatus can be prevented from, before the next apparatus receives the route request packet from the communication apparatus, selecting a route request packet only from route request packets received from other communication apparatuses and transmitting the selected route request packet. Accordingly, the possibility that the route request packet having a high route evaluation value is transmitted to the next relay apparatus is increased, and a route having a high route evaluation value can be created more certainly.

In addition, in the second embodiment, the number of route request packets, which is sufficient to create a route having a high route evaluation value, is set as a threshold value, and if the communication apparatus receives route request packets the number of which is equal to or larger than the threshold value, the communication apparatus transmits route request packets before the expiry of the waiting time period set based on route request packets that have been received thus far. Thus, at the time when the communication apparatus has received route request packets the number of which is sufficient to create a route having a high route evaluation value, the communication apparatus can transmit a selected route request packet to the next relay apparatus. Accordingly, the next apparatus can be prevented from, before the communication apparatus transmits a route request packet, selecting a route request packet only from route request packets received from other communication apparatuses and transmitting the selected route request packet. Therefore, a route having a high route evaluation value can be created more certainly.

Moreover, if the number of hops calculated from a route request packet that has been received for the second time or later by the communication apparatus is larger than the numbers of hops calculated from the route request packets that have been previously received, and if the first route evaluation value calculated from the route request packet that has been received for the second time or later by the communication apparatus is lower than the first route evaluation values calculated from the previously received route request packets, the communication apparatus transmits route request packets before the expiry of the waiting time period that has been previously set. Thus, if the number of hops increases and the first route evaluation value decreases, it is considered that a route through which a route request packet to be hereafter received will pass has more hops and a worse first route evaluation value than the routes through which the previously received route request packets have passed. Therefore, as soon as the number of hops increases and the first route evaluation value decreases, the communication apparatus transmits route request packets, whereby the communication apparatus can avoid setting an unnecessary waiting time period, and can transmit a route request packet sooner. Therefore, the next apparatus can be prevented from, before the communication apparatus transmits a route request packet, selecting a route request packet only from route request packets received from other communication apparatuses and transmitting the selected route request packet, and a route having a high route evaluation value can be created more certainly.

On the other hand, if the number of hops calculated from the newly received route request packet is larger than the numbers of hops calculated from the previously received route request, and if the first route evaluation value calculated from the newly received route request packet is higher than the first route evaluation values calculated from the previously received route request packets, the communication apparatus extends a waiting time period and attempts to receive another route request packet. Thus, if the number of hops increases and the first route evaluation value also increases, it is considered that a route through which a route request packet to be hereafter received will pass can have a better first route evaluation value, though the route might have more hops, than the routes through which the previously received route request packets have passed. Therefore, the communication apparatus can reduce failure of transmitting a route request packet, having a higher route evaluation value, the route request packet being received after the expiry of the waiting time period that is yet to be extended, and a route having a high route evaluation value can be created more certainly. Therefore, the communication apparatus transmits the route request packets to another relay apparatus, when a waiting time period set based on the previously received route request packets has elapsed, and can be prevented from being unable to select a route request packet, which is to be received hereafter and has a higher route evaluation value, whereby a route having a high route evaluation value can be created more certainly.

Note that in the second embodiment, for convenience of description, the route request packet 301 newly includes the evaluation reference value (0), and the evaluation reference value (0) stores the number of hops. However, any mode may be used as long as route evaluation values can be discriminated from each other. In addition, in the case where the first and the second embodiments are used in a combined manner, the route request packet 301 may further include a flag for discriminating them from each other.

In addition, although only an example in which timers are set up to twice is described in the second embodiment, timers can be set three or more times in the case where, after timers have been already set twice or more times, a newly received route request packet has taken a large number of hops and has a high route evaluation value.

In addition, in the second embodiment, since only the case where the condition identifier is "1" is described, only the evaluation reference values (0) and (1) and the evaluation measurement value (1) of the evaluation measurement value 309 are used. However, the second embodiment can be applied to the case where a plurality of conditions are used in a combined manner to search for an optimum route, as in the first embodiment. In this case, the evaluation reference value (2) and the subsequent evaluation reference values, and the evaluation measurement value (2) and the subsequent evaluation measurement value of the evaluation measurement value 309 may also be used, and the same processing as in the first embodiment may be performed by using the highest-priority route evaluation value and the number of hops. However, the case where, as in the case of using the condition identifier "6", a plurality of optimum routes that satisfy the respective conditions different from each other are searched for at the same time, will be described in detail in the third embodiment.

In addition, in the second embodiment, the timer changing processing may be performed as follows. After a plurality of timers are set through processing in STEP 1409 in FIG. 14, processing in STEP 1403 and STEP 1415 may be executed for only the timer that has started first, or for all the timers that are running. Alternatively, processing in STEP 1403 and STEP 1415 may not be executed for a timer that is running after the firstly set timer expires. In addition, after timers have been started twice, processing in STEP 1409 may not be executed.

In addition, in the second embodiment, in the case where the first route evaluation value of a route request packet that has been received before a waiting time period of a newly set timer expires is not higher than that of a previously transmitted route request packet, the comparison section 105 may not gore the received route request packet in the packet storage section 106 in STEP 711. In this case, even if the waiting time period of the newly set timer expires, the transmission section 109 does not transmit a route request packet having the first route evaluation value equal to or lower than that of the previously transmitted route request.

In addition, in the second embodiment, after a route request packet is transmitted when a preceding timer expires, when another route request packet is received before the subsequent timer expires, the comparison section 105 may cause the subsequent timer to expire if the first route evaluation value of the other route request packet is higher than a certain threshold value or if the first route evaluation value of the other route request packet is a certain or more percentage higher than the first route evaluation value of the previously transmitted route request packet. Contrariwise, after a route request packet is transmitted when a preceding timer expires, when another route request packet is received before the subsequent timer expires, the comparison section 105 may cause the subsequent timer to expire if the first route evaluation value of the other route request packet is lower than a certain threshold value or if the first route evaluation value of the other route request packet is a certain or more percentage lower than the first route evaluation value of the previously transmitted route request. In these cases, the transmission section 109 transmits the received route request packet before the expiry of the subsequent timer.

Third Embodiment

Next, the third embodiment will be described.

In the present embodiment, processing performed by the communication apparatus when the communication apparatus demands setting, at the same time, a route on which transmission delay is minimum and a route on which a minimum bandwidth is assured, for example, when it is requested to start transmitting both audio data and motion picture data, will be described.

In the present embodiment, immediately after the communication apparatus performs processing of updating the firstly received route request packet, the communication apparatus transmits the updated route request packet. Then, when a set timer expires, the communication apparatus transmits, among the route request packet that has been received for the second time and the subsequent route request packets, which are stored by the communication apparatus, a route request packet that has passed through a route having a high route evaluation value, that is, a route on which the minimum measurement value of bandwidths measured by the communication apparatuses on the route is the largest among all the routes. Hereinafter, the present embodiment will be described with reference to the drawings.

Figure 17:
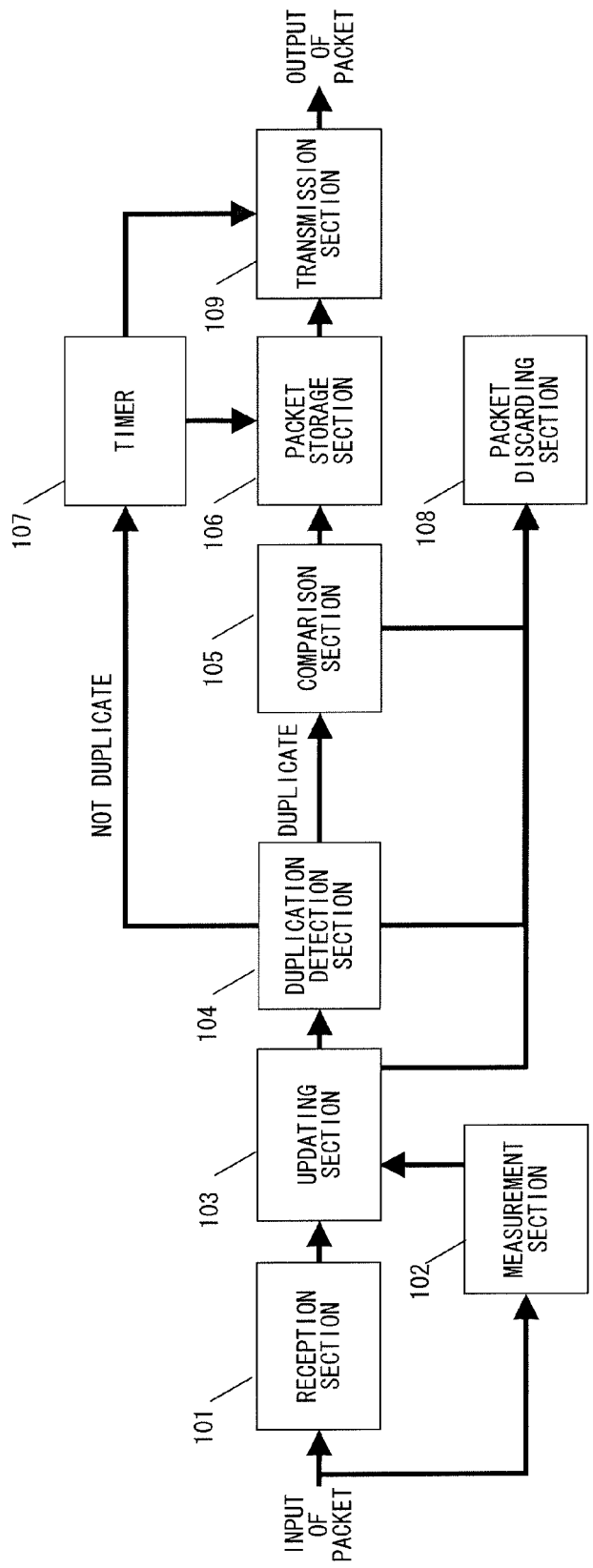
FIG. 17 is a function block diagram of a communication apparatus of a third embodiment.

FIG. 17 is a function block diagram of a communication apparatus according to the third embodiment of the present invention. Although the number and the type of components of the communication apparatus in FIG. 17 are the same as those in FIG. 1, the timer 107 and the transmission section 109 of the present embodiment are directly connected to each other in order that, when the timer 107 receives a route request packet that is not duplicately received, the timer 107 transmits the received route request packet.

Next, operation of each component of the present embodiment will be described. The components of the present embodiment shown in FIG. 17 are almost the same as those of the first embodiment, only operation of the timer 107 and the transmission section 109 are different from those of the first embodiment.

After the timer 107 finishes the same processing as in the first embodiment, the timer 107 outputs, to the transmission section 109, a route request packet outputted from the duplication detection section 104. Thereafter, the transmission section 109 immediately broadcasts the route request packet outputted from the timer 107.

Figure 18:
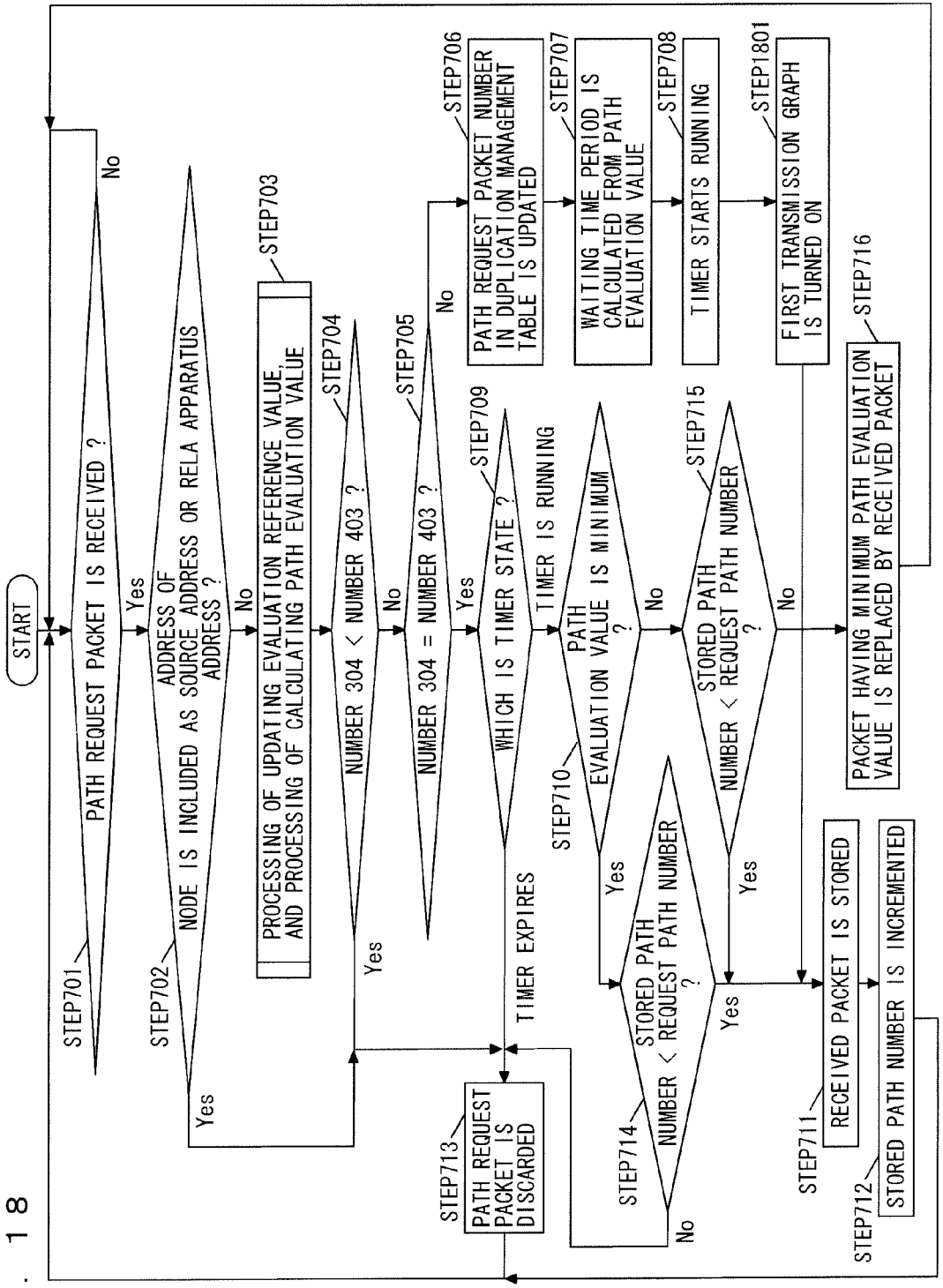
FIG. 18 is a flowchart showing route request packet reception processing performed by the communication apparatus of the third embodiment.

Operation of the communication apparatus having the above configuration will be described with reference to FIG. 18 and FIG. 19. FIG. 18 is a flowchart showing processing of receiving a route request packet, which is executed by each communication apparatus of the present embodiment. Note that in FIG. 18, the same steps of processing of reception as those shown in FIG. 7 in the first embodiment are denoted by the same reference numerals. Here, steps of processing that are different from those in FIG. 7 will be described.

Unlike FIG. 7, STEP 1801 is provided between STEP 708 and STEP 711 in FIG. 18. If the duplication detection section 104 determines that a received route request packet has been received for the first time by the communication apparatus (No in STEP 705), the timer 107 sets a timer (STEP 708), and then performs processing of setting a first transmission flag to ON (STEP 1801).

The first transmission flag is a flag for notifying the transmission section 109 that the transmission section 109 immediately transmits the firstly received route request packet. The first transmission flag is set to ON when the route request packet is received for the first time, and the first transmission flag is set to OFF when the firstly received route request packet is transmitted to the adjacent apparatuses. The first transmission flag may be added as a component of duplication management table 501, or an area for the flag may be provided in other memory spaces.

Thereafter, the packet storage section 106 stores the received route request packet (STEP 711), and increments the number of stored routes (STEP 712), and then processing in STEP 701 is executed.

Figure 19:
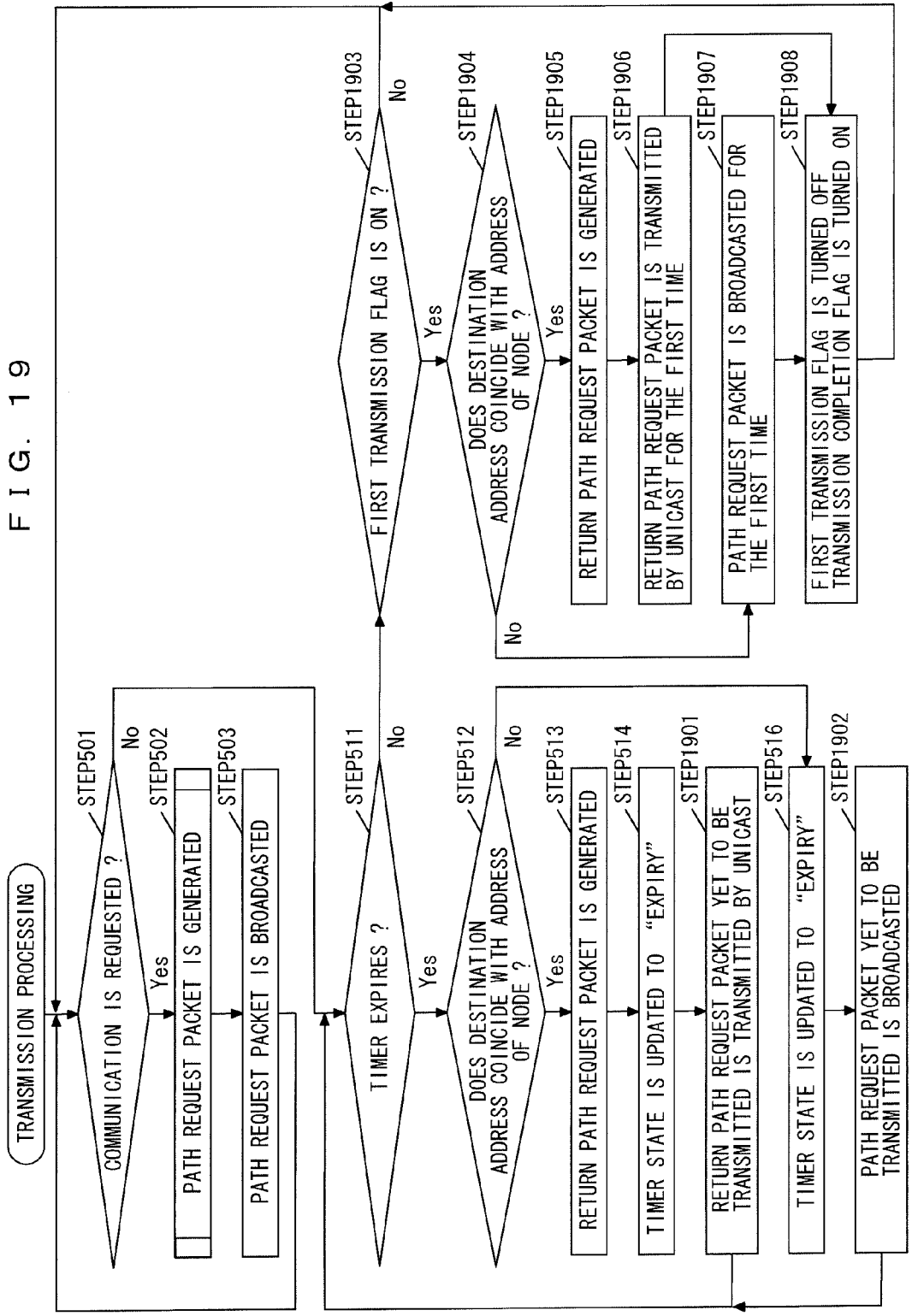
FIG. 19 is a flowchart showing route request packet transmission processing performed by the communication apparatus of the third embodiment.

FIG. 19 is a flowchart showing processing of transmitting a route request packet that is executed by each communication apparatus of the present embodiment. Note that in FIG. 19, the same steps of processing of transmission as those shown in FIG. 5 in the first embodiment are denoted by the same reference numerals. Here, steps of processing that are different from those in FIG. 5 will be described.

In the present embodiment, if the transmission section 109 determines that, among stored route request packets, there is no route request packet the timer for which has expired (No in STEP 511), the transmission section 109 determines whether or not the first transmission flag has been set at ON in the processing of reception (STEP 1903). If the transmission section 109 determines that the first transmission flag is not ON (No in STEP 1903), the transmission section 109 executes processing in STEP 511.

On the other hand, if the transmission section 109 determines that the first transmission flag is ON (Yes in STEP 1903), the transmission section 109 determines whether or not the destination address of the route request packet corresponding to the first transmission flag is the address of the communication apparatus (STEP 1904). If the transmission section 109 determines that the destination address of the route request packet is the address of the communication apparatus (Yes in STEP 1904), the transmission section 109, in order to return information about a route, to the source apparatus, generates a return request packet through the same processing as that in STEP 513 (STEP 1905), and transmits, by unicast, the return route request packet that is generated from a firstly received route request packet (STEP 1906). Thereafter, the transmission section 109 changes the first transmission flag to OFF, and changes a transmission completion flag corresponding to the transmitted route request packet to ON (STEP 1908), and then the processing in STEP 501 is executed.

The transmission completion flag is a flag for storing information about whether or not the route request packet has been transmitted to the adjacent apparatus. The transmission completion flag is set at OFF by default, and is set to ON once the route request packet is transmitted. An area for the transmission completion flag may be provided in an area in which a route request packet is stored, or an area for the transmission completion flag may be provided to the route request packet itself.

On the other hand, if the transmission section 109 determines that the destination address of the route request packet is not the address of the communication apparatus (No in STEP 1904), the transmission section 109 transmits, by broadcast, the route request packet, which has been received for the first time (STEP 1907). Thereafter, the transmission section 109 changes the first transmission flag to OFF, and changes a transmission completion flag corresponding to the transmitted route request packet to ON (STEP 1908), and then the processing in STEP 501 is executed.

If the transmission section 109 determines that, among route request packets stored in the packet storage section 106, there is a route request packet the timer for which has expired (Yes in STEP 511), the transmission section 109 transmits the route request packet. At this time, the transmission section 109 executes processing in STEP 1901 instead of the processing in STEP 515 in FIG. 5, and executes processing in STEP 1902 instead of the processing in STEP 517 in FIG. 5. In STEP 1901, the transmission section 109 transmits, by unicast, only a route request packet the transmission completion flag for which is not ON, that is, a route request packet that has not been transmitted yet, among route request packets stored in the packet storage section 106. In addition, in STEP 1902, the transmission section 109 transmits, by broadcast, only a route request packet the transmission completion flag for which is not ON, that is, a route request packet that has not been transmitted yet, among route request packets stored in the packet storage section 106. Thus, the transmission section 109 does not transmit again a route request packet that has been already transmitted, whereby consumption of bandwidth due to transmission of a route request packet can be reduced.

Figure 20:
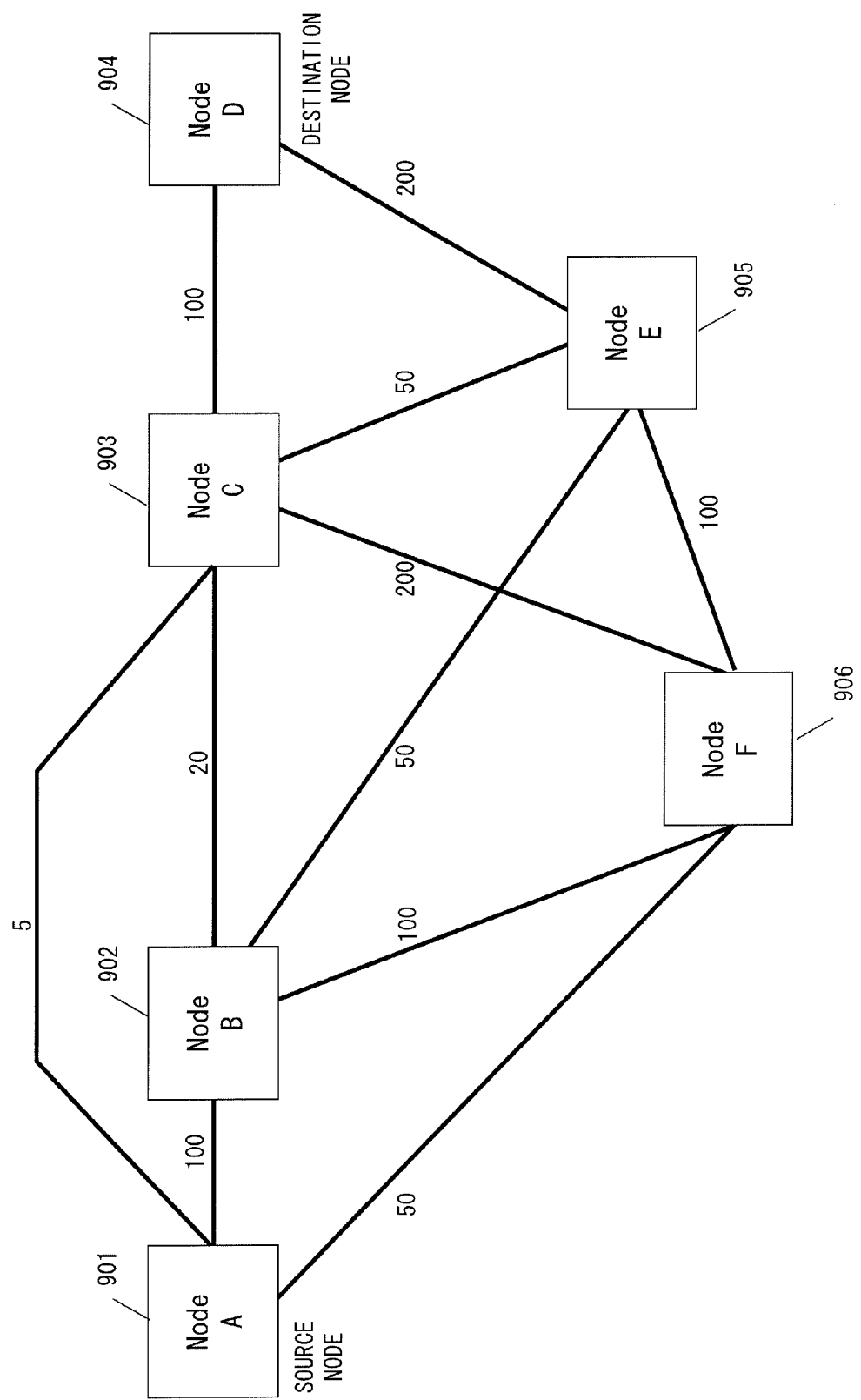
FIG. 20 is a network configuration diagram in the third embodiment.

Next, a specific example of the application of the invention of the third embodiment will be described with reference to FIGS. 20 and 21. FIG. 20 is a diagram showing a configuration of a network in the present embodiment. In FIG. 20, apparatuses that can directly communicate with each other are connected by solid lines, as in FIG. 9 and FIG. 15. In addition, a numerical value written for each solid line indicates the minimum measurement value 203 of the bandwidths of communication that are measured between a pair of apparatuses connected by a solid line during a certain time period and are stored in the measured value management table 201. For convenience of description, the communication apparatuses 901 to 906 are respectively referred to as nodes A to F, the order of the numerals corresponding to the order of the alphabets. Moreover, the addresses of the communication apparatuses 901 to 906 are respectively A to F, the order of the numerals corresponding to the order of the alphabets. In the present embodiment, the node A (source node) designates a condition in accordance with the type of data to be communicated between the node A and the node D (destination node), which cannot directly communicate with the node A, and then the node A searches for a route. Specifically, there will be described an example in which: the condition identifier 306 of a route request packet is set at "6"; and the node A searches, at the same time, for a route having the minimum number of hops, and for a route on which it is assured that the minimum value of bandwidth of communication is equal to or higher than a certain value.

Figure 21:
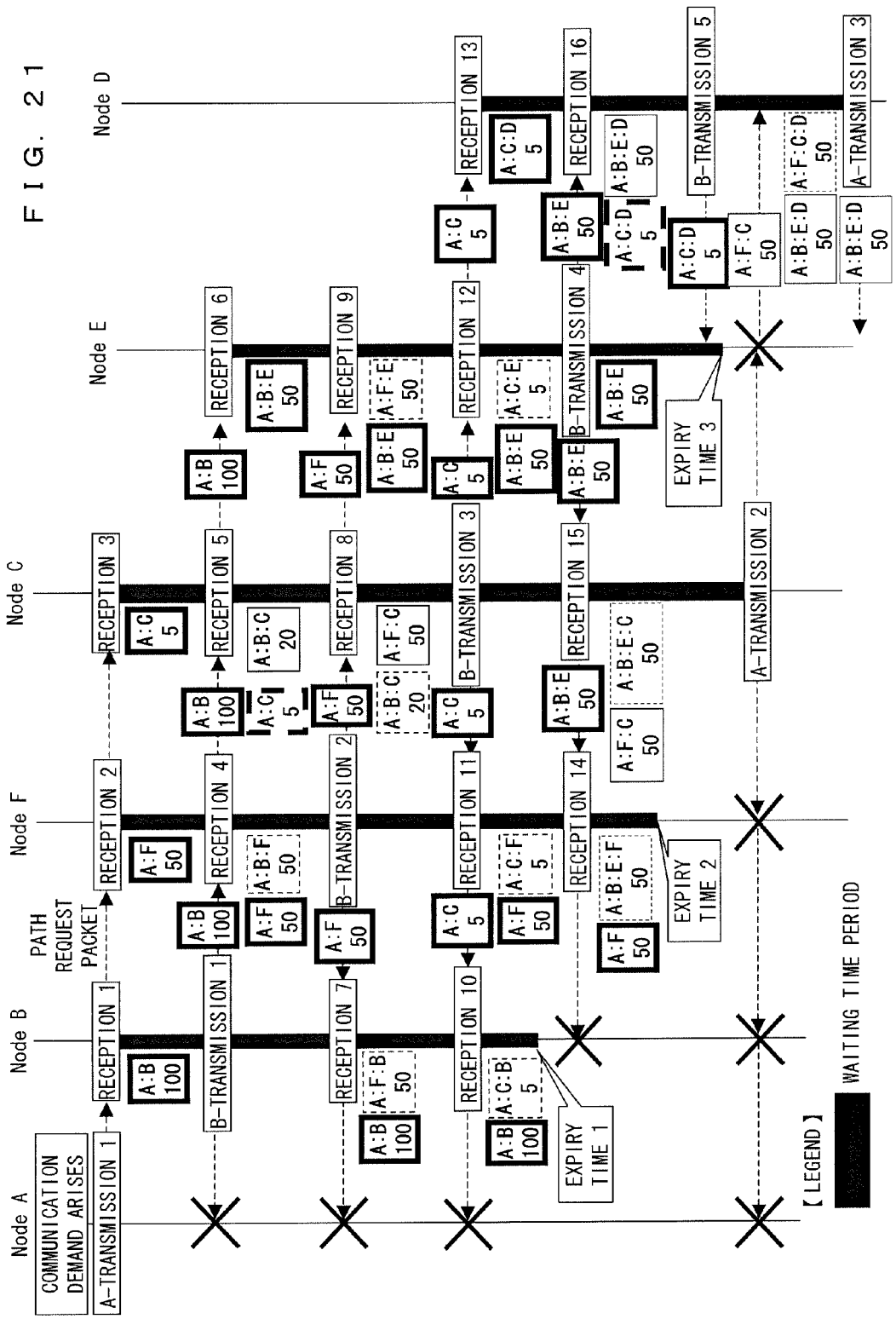
FIG. 21 is a sequence diagram showing the case where, in the second embodiment, data communication from the communication apparatus 901 to the communication apparatus 904 is requested.

FIG. 21 is a sequence diagram showing the case where, in the present embodiment, demand for starting data communication from the node A to the node D arises and the node A searches for a route to the node D. Although the signs and numbers shown in FIG. 21 are almost the same as those in FIG. 10, the signs and numbers shown in FIG. 21 are different with respect to the following.

In FIG. 21, "A-transmission" and "B-transmission" written in frames indicate two types of processing of transmission. In addition, "expiry time" written in balloons also indicates certain processing. "A-transmission" indicates processing of broadcasting a route request packet stored in the packet storage section 106, when the waiting time period of a timer expires. Therefore, "A-transmission" indicates the same processing as the processing of transmission described in the first embodiment. On the other hand. "B-transmission" indicates processing of, after a node receives a route request packet for the first time and updates the route request packet, immediately broadcasting the route requested packet. The processing indicated by "B-transmission" is processing specific to the present embodiment. "Expiry time" written in balloons indicates that a timer expires at the time indicated by the "Expiry time", and meanwhile that a route request packet received after a route request packet is transmitted at the time indicated by "A-transmission" is not transmitted since the route evaluation value of the received route request packet is lower than the route request packet transmitted at the time indicated by "A-transmission".

In addition, in FIG. 21, there are characters and numerals written in heavy line frames, which are not present in FIG. 10. The heavy line frames indicate that the contents in the heavy line frames relates to firstly received route request packets. Moreover, numerals in all frames in FIG. 21 indicate the evaluation reference values (2) of route request packets.

When demand for starting data communication arises, the node A creates a route request packet, based on the processing in FIG. 6, and transmits the route request packet. In the present embodiment, the route request packet transmitted by the node A is set such that the request route packet number is "1", the condition identifier is "6", and the route request packet number is "120". The evaluation reference value (1) is an area in which the number of hops is written, and the evaluation reference value (1) is set at "0", which is an initial value. The evaluation reference value (2) is an area in which a route evaluation value relating to the minimum value of the bandwidths of communication performed by each pair of communication apparatuses on the route through which the route request packet has passed is written. The evaluation reference value (2) is set at "0", which is an initial value.

When the node A transmits (A-transmission 1) a route request packet, each of the nodes B, F, and C receives the route request packet (reception 1, reception 2, and reception 3). The updating section 103 in each of the nodes B, F, and C increments the evaluation reference value (0) in the received route request packet, whereby the evaluation reference value (0) is updated to "1". In addition, the updating section 103 stores the address of the corresponding node as the last relay apparatus address in the received route request packet. Thereafter, when the updating section 103 determines that the condition identifier of the received route request packet is set at "6", the updating section 103 updates the evaluation reference value (2) included in the received route request packet, to the value of the minimum measurement value 206 obtained from the measured value management table 201. For example, the node B in the updating section 103 adds "B" as a relay apparatus address of the received route request packet, and updates the evaluation reference value (1) and the evaluation reference value (2) to "1" and "100", respectively (at the left of and below "reception 1"). The updating section 103 in the node F adds "F" as a relay apparatus address of the received route request packet, and updates the evaluation reference value (1) and the evaluation reference value (2) to "1" and "50", respectively (at the left of and below "reception 2"). The updating section 103 in the node C adds "C" as a relay apparatus address of the received route request packet, and updates the evaluation reference value (1) and the evaluation reference value (2) to "1" and "5", respectively (at the left of and below "reception 3"). After updating the route request packet, the updating section 103 in each of the nodes B, F, and C calculates the route evaluation values respectively based on the evaluation reference values (1) and (2).

Thereafter, the duplication detection section 104 in each of the nodes B, F, and C determines whether or not the received route request packet is duplicately received. When the duplication detection section 104 determines that the received route request packet has been received for the first time by the node, the duplication detection section 104 outputs the received route request packet and the corresponding route evaluation values to the timer 107.

The timer 107 calculates a waiting time period, based on the route evaluation value corresponding to the evaluation reference value (2), and sets a timer for the waiting time period. At this time, the timer 107 in each of the nodes B, F, and C sets the timer such that the timers expires in descending order starting from the timers set based on the largest route evaluation value corresponding to the evaluation reference value (2), that is, in the order of the timer of the node B, the timer of the node F, and the timer of the node C. Thereafter, the packet storage section 106 stores the route request packet. The timer 107 sets the first transmission flag at ON, and notifies the transmission section 109 that the node has received the route request packet for the first time.

Hereinafter, processing performed when each node transmits the received route request packet or receives the transmitted route request packet will be described. First, the node B immediately broadcasts (B-transmission 1) the route request packet in which the relay apparatus address and the evaluation reference value (2) are set at "B" and "100", respectively.

Each of the nodes F, C, and E receives the transmitted broadcasted route request packet (reception 4, reception 5, and reception 6). Thereafter, the updating section 103 in each of the nodes F, C, and E adds the address of the node as the relay apparatus address 308 of the received route request packet. Thereafter, when the updating section 103 in each of the nodes F, C, and E determines that the condition identifier of the received route request packet is set at "6", the updating section 103 updates the evaluation reference value (1) and the evaluation reference value (2). As a result, the node F adds "F" as a relay apparatus address of the received route request packet, and updates the evaluation reference value (2) to "50" (at the left of and below "reception 4"). The node C adds "C" as a relay apparatus address of the received route request packet, and updates the evaluation reference value (2) to "20" (at the left of and below "reception 5"). The node E adds "E" as a relay apparatus address of the received route request packet, and updates the evaluation reference value (2) to "50" (at the left of and below "reception 6").

Since the route request packet received (reception 6) by the node E has been received for the first time by the node E, the node E stores the received route request packet and sets a timer. Moreover, the node E transmits the received route request packet (B-transmission 4).

On the other hand, since the route request packet received (reception 4 or reception 5) by each of the nodes F and C is duplicately received, each of the nodes F and C compares the route evaluation value corresponding to the evaluation reference value (2) of the firstly received route request packet which is stored, with the route evaluation value corresponding to the evaluation reference value (2) of the secondly received route request packet. As a result of the comparison, the node C stores the secondly received route request packet, the secondly received route request packet indicating "A:B:C" as the passed node addresses, and "20" as the evaluation reference value (2), and discards the Firstly received route request packet (at the left of and below "reception 5"). On the other hand, since the evaluation reference values (2) of the route request packets that have been respectively received for the first time and for the second time by the node F are equal to each other, the node F continues to store the firstly received route request packet which has the evaluation reference value (1) lower than that of the secondly received route request packet, and discards the secondly received route request packet ("reception 4" at the left of and below).

Similarly, the nodes F and C transmit (B-transmission 2 and B-transmission 3) the respective firstly received route request packets at "reception 2" and "reception 3", respectively.

Thereafter, when the tinier of each node expires, the node broadcasts the route request packet stored in the node. Although the node B attempts to transmit the stored route request packet at the time when the timer expires, since the stored route request packet is the firstly received route request packet and the node B has already transmitted the stored route request packet, the node B does not transmit the stored route request packet (expiry time 1). The nodes F and E also do not transmit the stored route request packets at the time when the timer expires, since the stored route request packets are route request packets that have been received for the first time by the nodes F and E (expiry time 2 and expiry time 3). On the other hand, since at the time when the timer expires, the node C has stored a thirdly received route request packet, the node C transmits the thirdly received route request packet (A-transmission 2). In the route request packet transmitted by the node C at this time, the passed node address and the evaluation reference value (2) are set at "A:F:C" and "50", respectively.

Finally, similarly to the other relay apparatus, the node D, which is the destination node, also transmits (B-transmission 5) the firstly received route request packet, the firstly received route request packet having taken the minimum number of hops.

Thus, before the timer expires, the communication apparatus immediately transmits the route request packet that has been received for the first time by the communication apparatus, whereby the time taken until a route is set for the first time can be reduced in comparison with the case of the first and the second embodiments.

As described above, in the third embodiment, the communication apparatus immediately broadcasts the firstly received route request packet. Then, the communication apparatus selects, from route request packets which have been duplicately received within the waiting time period, route request packets having higher route evaluation values for the route from the source apparatus to the communication apparatus, the number of route request packets to be selected being equal to the number of routes to be set. Since there is a high possibility that the firstly received route request packet has been relayed through a route having a small number of hops, the communication apparatus can create a route having a small number of hops by broadcasting the firstly received route request packet. At the same time, the communication apparatus can create a route having a high route evaluation value by broadcasting a route request packet having a high route evaluation value after the timer expires. As a result, since a plurality of routes based on different evaluation references are created by one time processing of creating routes, the communication apparatus can efficiently set a route when, for example, it is requested to transmit different types of data at one time.

In the third embodiment, the first transmission flag is provided to each communication apparatus, and thereby each communication apparatus manages information about whether or not the firstly received route request packet has been transmitted. However, instead of the first transmission flag, an area in which the firstly received route request packet is stored may be provided to each communication apparatus, and if data is present in the area, each communication apparatus may determine that the firstly received route request packet has not been transmitted.

In addition, some of the steps of processing in the second embodiment may be added to processing in the third embodiment. For example, processing in STEP 1201 in FIG. 12 may be executed instead of processing in STEP 703 in FIG. 18, and processing in STEP 1202 in FIG. 12 may be executed between STEP 709 and STEP 710 in FIG. 18.

Example of Configuration of Hardware

Figure 22:
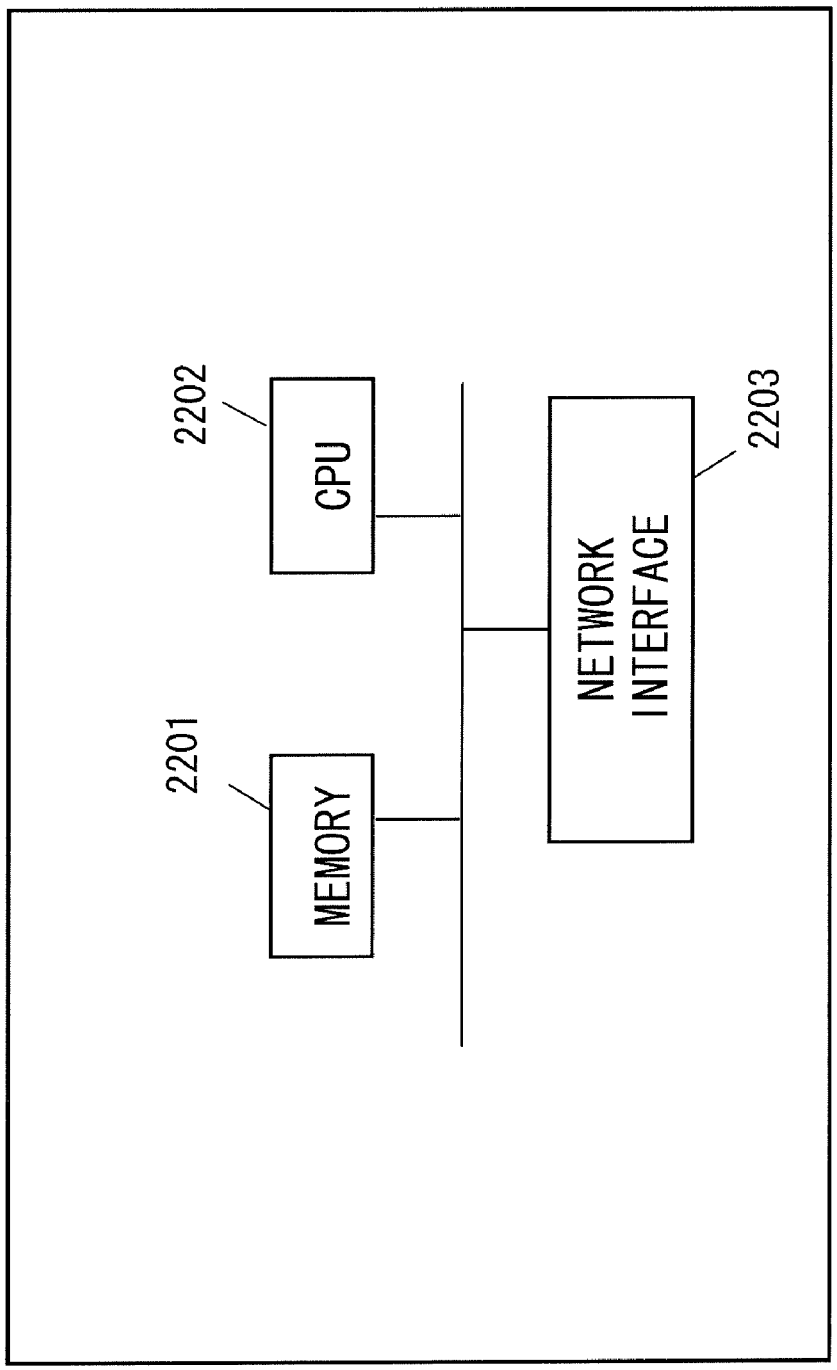
FIG. 22 is a hardware diagram showing the configuration of hardware of a communication apparatus.

Next, an example of the configuration of hardware according to the present invention will be described. FIG. 22 is a hardware diagram showing the configuration of hardware of the communication apparatus. In FIG. 22, the communication apparatus comprises a memory 2201 that includes various control programs and a work area, a CPU (Central Processing Unit) 2202 for controlling the whole communication apparatus, and a network interface 2203 for communicating data. The communication apparatus causes the CPU 2202 to execute a program stored in the memory 2201, transmits data via the network interface 2203, and receives data via the network interface 2203 by the CPU 2202 decoding the data. When PLC is used, the network interface 2203 is connected to power lines, and various data is transmitted via the power lines. On the other hand, when wireless communication is used, various data is transmitted by various wireless communication methods such as Wi-Fi or MANET.

The memory 2201 stores the measured value management table 201 in FIG. 2, and the duplication management table 401 in FIG. 4. In addition, the memory 2201 stores the received route request packet number of the second embodiment, and the transmission flag and the transmission completion flag of the third embodiment. Moreover, the memory 2201 temporarily stores a route request packet that is stored in the packet storage section 106.

The CPU 2202 includes the function blocks shown in FIG. 1, and executes the processes described in the first to third embodiments.

Note that function blocks described in each embodiment of the present invention may be realized as an LSI. Each of the function blocks may be included in one chip, or some or all of the function blocks may be included in one chip.

The LSI can be referred to as an IC, a system LSI, a super LSI, an ultra LSI, depending on their integration degree.

In addition, a method of forming an integrated circuit is not limited to LSI, and a dedicated circuit or a general-purpose processor may be used. Alternatively, an FPGA (Field Programmable Gate Array) which can be programmed after an LSI is manufactured, or a reconfigurable processor which enables a connection or setting of a circuit cell in an LSI to be reconfigured, may be used. Alternatively, a configuration in which a control program of a ROM storing a processor is executed in a hardware resource having a processor, a memory, and the like, may be used.

Moreover, if a technology, for forming an integrated circuit, which can replace LSI emerges owing to advancement of a semiconductor technology or owing to another technology derived therefrom, it is natural that such a technology may be used for integrating function blocks. Biotechnology can be applied, for example.

The present invention can create, between a source apparatus and a destination apparatus, a route having a high route evaluation value, which indicates a state of the route, while the present invention reduces the number of route request packets to be transmitted for creating a route and suppresses consumption of bandwidth. Thus, the present invention can be applied to communication apparatuses and communication methods for various networks, for example, PLC network and wireless network etc.

DESCRIPTION OF REFERENCE CHARACTERS

101 reception section
102 measurement section
103 updating section
104 duplication detection section
105 comparison section
106 packet storage section
107 timer
108 packet discarding section
109 transmission section
901 to 906 communication apparatus
2201 memory
2202 CPU
2203 network interface

The invention claimed is:

1. A communication apparatus for transmitting a route request packet for creating a route to relay apparatuses such that the route request packet arrives at a destination apparatus, when a source apparatus requests communication by a multi-hop technique with the destination apparatus which is a destination, the communication apparatus comprising:

a reception section for receiving from at least one immediately preceding relay apparatus among the relay apparatuses, which has directly transmitted the route request packet to the communication apparatus, the route request packet, the route request packet including information indicating 1) the source apparatus, 2) the destination apparatus, and 3) a route evaluation value indicating a route state of a route from the source apparatus to the immediately preceding relay apparatus;

an updating section for calculating a route evaluation value corresponding to a route from the source apparatus to the communication apparatus, the route evaluation value being based on 1) the route state of the route from the source apparatus to the immediately preceding relay apparatus, the route state of the route being written in the received route request packet, and 2) a route state of a route from the immediately preceding relay apparatus to the communication apparatus, and the updating section also updates the route evaluation value in the route request packet; and a control section for:
setting, when the route request packet is received, a waiting time period starting from a time at which the route request packet is received, without transmitting the route request packet to an adjacent apparatus that directly communicates with the communication apparatus;

selecting, after an end of the waiting time period, a predetermined number of route request packets in descending order starting from a route request packet including a highest route evaluation value, from among route request packet received at the start of the waiting time period, and route request packets whose route evaluation values are updated by the updating section during the waiting time period and which include the same information indicating the source apparatus and the same information indicating the destination apparatus as those included in the route request packet received at the start of the waiting time period; and transmitting the selected predetermined number of route request packets to the adjacent apparatus.

2. The communication apparatus according to claim 1, further comprising a measurement section for measuring, at a plurality of times, bandwidths that can be used in communication between the communication apparatus and the adjacent apparatus, wherein a route state of a route includes bandwidths that can be used in communication between respective pairs of communication apparatuses present on the route, the bandwidths being included so as to correspond to the pair of communication apparatuses, and the updating section:

calculates, as the route evaluation value, a bandwidth that can be used on an entire route from the source apparatus to the communication apparatus, the route evaluation value being based on 1) bandwidths that can be used in communication between each of pairs of communication apparatuses present on the route from the source apparatus to the immediately preceding relay apparatus, the bandwidths being written in the received route request packet, and 2) the bandwidths, measured by the measurement section, that can be used in communication between the communication apparatus and the immediately preceding relay apparatus; and calculates the route evaluation value such that the larger the bandwidth that can be used on the entire route, the higher the route evaluation value is.

3. The communication apparatus according to claim 1, further comprising a measurement section for measuring, at a plurality of times, bandwidths that can be used in communication between the communication apparatus and the adjacent apparatus, and for obtaining a minimum value from among the measured bandwidths, wherein a route state of a route includes a minimum value of bandwidths that can be used between respective pairs of communication apparatuses present on the route, and the updating section:

compares the minimum value of bandwidths that can be used between respective pairs of communication apparatuses from the source apparatus to the immediately preceding relay apparatus, the minimum value being written in the received route request packet, with a minimum value of bandwidths, measured by the measurement section, that can be used between the communication apparatus and the immediately preceding relay apparatus, calculates, as the route evaluation value, a minimum value of bandwidths on an entire route from the source apparatus to the communication apparatus, and calculates the route evaluation value such that the larger the bandwidth that can be are used on the entire route, the higher the route evaluation value.

4. The communication apparatus according to claim 1, further comprising a measurement section for measuring an elapsed time period from a latest time at which a state between the communication apparatus and an adjacent apparatus has changed from a state in which communication cannot be performed to a state in which communication can be performed, wherein the route state of a route includes a minimum value of the elapsed time periods measured by respective communication apparatuses on the route, and the updating section:

compares the minimum value of the elapsed time periods measured between respective pairs of communication apparatuses from the source apparatus to the immediately preceding relay apparatus, the minimum value being written in the received route request packet, with the elapsed time period measured between the communication apparatus and the immediately preceding relay apparatus by the measurement section, calculates a minimum value of the elapsed time period corresponding to an entire route from the source apparatus to the communication apparatus, and calculates the route evaluation value such that the longer the calculated minimum value, the higher the route evaluation value.

5. The communication apparatus according to claim 1, wherein a route state of a route includes a number of hops on the route, and the updating section calculates the number of hops on the route from the source apparatus to the communication apparatus by adding 1 to the number of hops on the route from the source apparatus to the immediately preceding relay apparatus, the number of hops being written in the received route request packet, and the updating section calculates the route evaluation value such that the smaller the calculated number of hops, the higher the route evaluation value.

6. The communication apparatus according to claim 1, wherein a route state of a route includes a number of hops on the route, and the updating section:

calculates the number of hops on the route from the source apparatus to the communication apparatus by adding 1 to the number of hops on the route from the source apparatus to the immediately preceding relay apparatus, the number of hops being written in the received route request packet, and calculates a second route evaluation value such that the smaller the calculated number of hops is, the higher the second route evaluation value is, and the control section:

selects a predetermined number of route request packets in descending order starting from a route request packet including a highest second route evaluation value, if the number of route request packets including the same route evaluation value among the route request packet received at the start of the waiting time period and route request packets whose route evaluation values are updated by the updating section during the waiting time period and which include the same information indicating the source apparatus and the same information indicating the destination apparatus as those included in the route request packet received at the start of the waiting time period is equal to or larger than the predetermined number.

7. The communication apparatus according to claim 1, wherein, when the route request packet is received, the control section sets the waiting time period in accordance with the route evaluation value calculated for the route request packet by the updating section.

8. The communication apparatus according to claim 7, wherein, when the route request packet is received, the control section sets the waiting time period such that the lower the route evaluation value calculated for the route request packet by the updating section, the longer the waiting time period.

9. The communication apparatus according to claim 7, wherein, if an expiration time of a waiting time period set based on a latest received route request packet is earlier than an expiration time of a waiting time period set based on a previously received route request packet, the control section reduces the waiting time period to the waiting time period set based on the latest received route request packet, and transmits a route request packet at the expiration time of the waiting time period set based on the latest received route request packet.

10. The communication apparatus according to claim 7, wherein, when the route request packet is received for a second or subsequent time, the control section determines whether or not a number of route request packets that have been received is equal to a predetermined threshold value, and when the control section determines that the number of route request packets that have been received is equal to a predetermined threshold value, the control section transmits a route request packet.

11. The communication apparatus according to claim 7, wherein
a route state of a route includes a number of hops on the route,
the updating section further calculates the number of hops on the route from the source apparatus to the communication apparatus by adding 1 to the number of hops on the route from the source apparatus to the immediately preceding relay apparatus, the number of hops being written in the received route request packet, and
the control section:
determines whether or not a first condition is satisfied and whether or not a second condition is satisfied, the first condition being that the number of hops calculated by the updating section is larger than the number of hops calculated from a previously received route request packet, and the second condition being that the route evaluation value calculated from a latest received route request packet is lower than the route evaluation value calculated from the previously received route request packet; and
transmits a route request packet when the control section determines that both the first condition and the second condition are satisfied.

12. The communication apparatus according to claim 11, wherein, when the control section determines that the first condition is satisfied and that the second condition is not satisfied, the control section extends the waiting time period to a waiting time period set based on the latest received route request packet, and transmits a route request packet when the waiting time period set based on the latest received route request packet expires.

13. The communication apparatus according to claim 12, wherein, if the waiting time period is extended, the control section selects a route request packet at an expiration time of the waiting time period yet to be extended, and transmits the selected route request packet, and the control section further selects a route request packet at an expiration time of the extended waiting time period, and transmits the selected route request packet.

14. The communication apparatus according to claim 1, wherein the control section collectively writes, in one route request packet, information written in selected route request packets.

15. The communication apparatus according to claim 1, wherein the source apparatus writes, in the route request packet, information indicating a number of routes, which is the predetermined number.

16. The communication apparatus according to claim 1, wherein the control section discards the route request packet received after the waiting time period expires.

17. A communication method of transmitting a route request packet for creating a route to relay apparatuses such that the route request packet arrives at a destination apparatus, when a source apparatus which requests start of communication communicates by a multi-hop technique with the destination apparatus which is a destination, the communication method comprising:
receiving from at least one immediately preceding relay apparatus among the relay apparatuses, which has directly transmitted the route request packet to a communication apparatus, the route request packet, the route request packet including information indicating 1) the source apparatus, 2) the destination apparatus, and 3) a route evaluation value indicating a route state of a route from the source apparatus to the immediately preceding relay apparatus;
calculating a route evaluation value corresponding to a route from the source apparatus to the communication apparatus, the route evaluation value being based on 1) the route state of the route from the source apparatus to the immediately preceding relay apparatus, the route state of the route being written in the received route request packet, and 2) a route state of a route from the immediately preceding relay apparatus to the communication apparatus;
updating the route evaluation value included in the route request packet;
setting, when the route request packet is received, a predetermined waiting time period starting from a time at which the route request packet is received, without transmitting the route request packet to an adjacent apparatus that directly communicates with the communication apparatus;
selecting, after an end of the waiting time period, a predetermined number of route request packets in descending order starting from a route request packet including a highest route evaluation value, from among the route request packet received at the start of the waiting time period and route request packets whose route evaluation values are updated by the updating step during the waiting time period and which include the same information indicating the source apparatus and the same information indicating the destination apparatus as those included in the route request packet received at the start of the waiting time period; and
transmitting the selected predetermined number of route request packets to the adjacent apparatus.

* * * * *